United States Patent
Cath et al.

(10) Patent No.: US 7,914,680 B2
(45) Date of Patent: Mar. 29, 2011

(54) SYSTEMS AND METHODS FOR PURIFICATION OF LIQUIDS

(75) Inventors: Tzahi Y. Cath, Reno, NV (US); Amy E. Childress, Reno, NV (US)

(73) Assignee: Board of Regents of the Nevada System of Higher Education, on behalf of the University of Nevada, Reno, Reno, NV (US)

( * ) Notice: Subject to any disclaimer, the term of this patent is extended or adjusted under 35 U.S.C. 154(b) by 0 days.

(21) Appl. No.: 12/837,355

(22) Filed: Jul. 15, 2010

(65) Prior Publication Data

US 2011/0017666 A1    Jan. 27, 2011

Related U.S. Application Data

(62) Division of application No. 11/295,807, filed on Dec. 6, 2005.

(60) Provisional application No. 60/634,609, filed on Dec. 8, 2004, provisional application No. 60/634,026, filed on Dec. 6, 2004.

(51) Int. Cl.
   *B01D 61/58*   (2006.01)
   *B01D 61/00*   (2006.01)
   *B63J 1/00*    (2006.01)
(52) U.S. Cl. .............. 210/644; 210/652; 210/321.6; 203/10; 203/11
(58) Field of Classification Search .............. None
   See application file for complete search history.

(56) References Cited

U.S. PATENT DOCUMENTS

| 3,130,156 | A | * | 4/1964 | Neff .............................. 210/177 |
| 3,386,912 | A | * | 6/1968 | Lazare ........................... 210/638 |
| 3,617,547 | A | * | 11/1971 | Halff et al. .................... 210/638 |
| 3,670,897 | A | * | 6/1972 | Frank .......................... 210/321.6 |
| 3,707,231 | A | * | 12/1972 | Bradley ......................... 210/98 |
| 3,906,250 | A | * | 9/1975 | Loeb ............................ 290/1 R |
| 4,193,267 | A | * | 3/1980 | Loeb ............................. 60/649 |
| 5,098,575 | A | * | 3/1992 | Yaeli ............................ 210/652 |
| 6,391,205 | B1 | * | 5/2002 | McGinnis ..................... 210/644 |
| 6,849,184 | B1 | * | 2/2005 | Lampi et al. .................. 210/649 |

* cited by examiner

*Primary Examiner* — Krishnan S Menon
(74) *Attorney, Agent, or Firm* — Ryan A. Heck; UNR-DRI Technology Transfer Office

(57) ABSTRACT

The present disclosure provides methods and systems for purifying liquids. In a particular implementation, the system includes a forward-osmosis unit for diluting a water source for a downstream desalination unit. A pretreatment unit may be located hydraulically upstream of the desalination unit, such as upstream or downstream of the forward-osmosis unit. In certain embodiments, the system includes an extraction unit for extracting a relatively easily extractable osmotic agent from an osmotic draw solution. The system may include one or more forward-osmosis units downstream of the desalination unit for diluting a concentrated brine stream produced by the desalination unit. In particular embodiments, a downstream forward-osmosis unit uses the concentrated brine stream as an osmotic agent, such as to extract water from seawater or brackish water. Another downstream forward-osmosis unit may use impaired water as a feed stream.

6 Claims, 8 Drawing Sheets

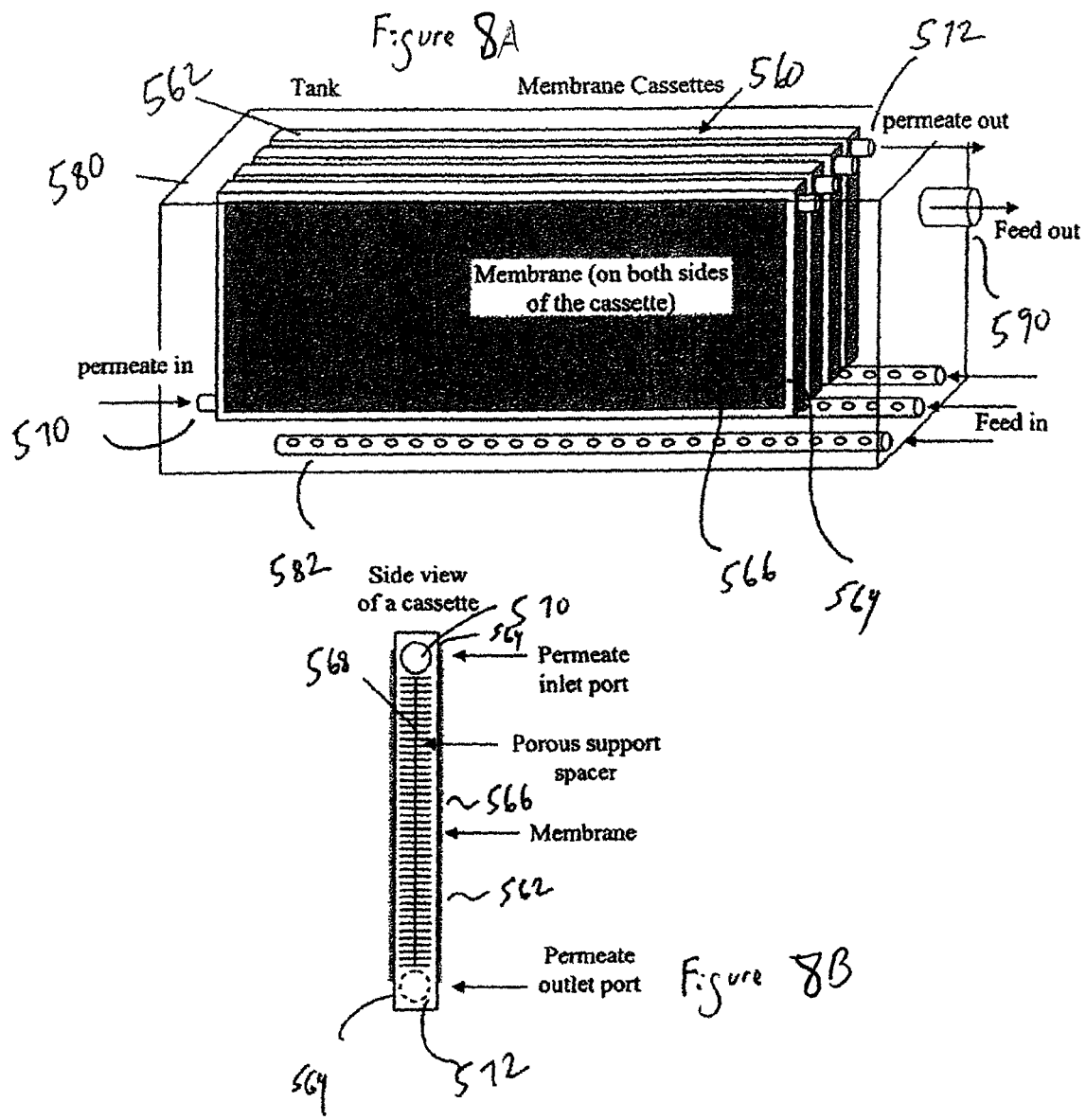

SYSTEMS AND METHODS FOR PURIFICATION OF LIQUIDS

This application is a divisional of, and incorporates by reference, U.S. patent application Ser. No. 11/295,807, filed Dec. 6, 2005, which in turn claims the benefit of, and incorporates by reference, U.S. Provisional Patent Application Nos. 60/634,609 filed Dec. 8, 2004, and 60/634,026 filed Dec. 6, 2004.

FIELD

This disclosure pertains to liquid-treatment apparatus and methods. Particular embodiments provide such methods and apparatus as usable for producing potable or otherwise cleaned (and hence useful) water from a source of non-potable or otherwise impaired water.

BACKGROUND

As the demand for water has grown, industry has long sought processes for the desalination of salt water, such as seawater or brackish water. Some processes that have been used to desalinate water are distillation and membrane processes, such as reverse osmosis, nanofiltration, and electrodialysis.

Water recovery is a major economic parameter of drinking water production. However, this parameter is typically limited in existing processes. In addition to limited water recovery, another drawback is that these processes are typically considered energy intensive. Membrane based systems can suffer from additional problems. For example, membrane fouling and scaling in pressure-driven membrane processes (e.g., in reverse osmosis and nanofiltration) are often a major area of concern, as they can increase the cost of operating and maintaining the systems. Pretreatment of the feed water is a way of reducing fouling and scaling, but is typically expensive. An additional drawback of most membrane-based systems is that increased salt content of the feed stream typically reduces the flux of product water due to the lower osmotic potential difference between the feed solution and the permeate.

Seawater desalination has become a common practice to supply the growing demand for water in areas having access to the sea. Shortage of potable (drinking) water in inland areas pose much more complicated challenges to water authorities, governments, and other stakeholders. Inland regions are restricted to the use of surface water and groundwater.

SUMMARY

Embodiments of the present disclosure provide systems and methods for purifying a liquid, such reducing its solute load. In particular implementations, the liquid to be purified is seawater, brackish-water, impaired-water, wastewater, or other source (generally referred to as source water). In further implementations, the source water is purified to a potable level.

In one aspect, systems are provided for purifying a liquid, such as source water. In one embodiment, the system includes a water purification unit, such as a desalination unit, in combination with an upstream forward osmosis unit that dilutes a feed-water stream entering the desalination unit. The upstream forward-osmosis unit is located hydraulically upstream of the desalination unit and is configured to receive a stream of high salinity source water. The source water passes through the upstream forward-osmosis unit on a receiving side of a semipermeable membrane in the upstream forward-osmosis unit. Meanwhile, a stream of liquid having a relatively low osmotic potential (e.g., a liquid having a low salinity compared to the high salinity source water) passes through the upstream forward-osmosis unit on a feed side of the membrane, which results in a net transfer of water through the membrane from low osmolality liquid water to the source water, diluting the source water. In a particular implementation, the resulting diluted source water is used as a feed for the desalination unit. By diluting the feed stream entering the desalination unit, the energy expenditure (per unit of product water) of the desalination unit can be reduced. The desalination unit produces a stream of product water and a stream of brine concentrate.

A further embodiment of the system includes the components of the previous embodiment and further includes a pretreatment unit located upstream or downstream of the upstream forward-osmosis unit. The pretreatment unit treats the source water before or after the source water passes through the upstream forward-osmosis unit. In particular implementations, the pretreatment unit reduces the particulate or solute load (or both) of the source water. In certain examples, the pretreatment unit is configured to perform one or more of coagulation, media filtration, microfiltration, ultrafiltration, beach wells, ion-exchange, chemical addition, disinfection, and other membrane process, in any suitable order.

In another embodiment, the system includes the components in the first described embodiment as well as a downstream forward-osmosis system situated hydraulically downstream of the water purification unit, such as the desalination unit. The downstream forward-osmosis system receives the stream of concentrate (such as concentrated brine from the desalination unit) from the water purification unit, dilutes the concentrate, and optionally returns the diluted concentrate to upstream of the water purification unit, such as a feed to the water purification unit. As a result, feed pretreatment of the stream provided by the upstream forward-osmosis unit to the water purification unit can be reduced.

The downstream forward-osmosis system can be configured as a two-stage forward-osmosis system including a first-stage forward-osmosis unit and a second-stage forward-osmosis unit connected in tandem. In a particular implementation, each of these forward-osmosis units includes a respective semipermeable membrane. In particular examples, the first-stage forward-osmosis unit performs forward-osmosis of the concentrate from the water purification unit, such as a liquid brine stream from the desalination unit, against a feed stream, such as sweater, brackish water, or other source water. Because of the relatively high osmotic potential of the concentrate stream, seawater or other suitable source water having a high solute load can be used as a feed, while still providing net transfer of water across the respective membrane to the concentrate stream. Thus, the concentrate is diluted.

In further implementations, the second-stage forward-osmosis unit performs forward-osmosis of the output of the first-stage forward-osmosis unit against a feed stream of source water having a lower solute load than the output of the first-stage forward-osmosis unit, such as impaired water. The output of the second-stage forward-osmosis unit can be circulated back to upstream of the water purification unit to serve as feed to the water purification unit.

In certain aspects, the downstream forward-osmosis system can be used, after a first cycle of operation of the treatment system, to supply a portion, desirably most, of the feed water to the water purification unit. Any required additional feed water can be supplied as make-up water from the upstream forward-osmosis unit. Supplying at least most of the feed to the water purification unit from the downstream forward-osmosis system can minimize dependence of the system on initial pretreatment and promote savings in capital equipment and operating costs.

According to a further embodiment, the system is similar to the previous embodiment but includes an energy-recovery system situated downstream of the water purification unit and upstream of the downstream forward-osmosis system. The energy-recovery system can be, for example, a heat-exchanger if the water purification unit is a thermal-water purification device. Alternatively, the energy-recovery system can be a power exchanger (if the water purification unit is a pressure-driven unit). In a particular implementation, the energy-recovery system can be any of various other energy-extracting devices that extract usable energy from liquid passing through it. In a further implementation, the energy-recovery system is a combination of multiple energy-extracting devices as required or desired. In particular implementations, the system does not include the forward-osmosis unit upstream of the desalination unit. In a yet further implementation, the system does not include the pretreatment unit.

In a particular implementation, the system includes a purification loop, such as a desalination process that can provide a higher water recovery than reverse osmosis. In a more particular implementation, the purification loop is a membrane distillation purification loop, such as a desalination loop, situated upstream of the downstream forward-osmosis system. The membrane distillation purification loop can extract additional product water from a concentrate stream produced by the water purification unit, such as a stream of brine produced by a desalination unit. The membrane distillation purification loop includes a membrane distillation unit that produces a product-water stream that, when combined with product water produced by the water purification unit, can further increase overall water recovery from the system and enhance the efficiency of the downstream forward-osmosis system.

In a more particular implementation, the membrane distillation purification loop is an enhanced membrane distillation purification loop including an enhanced membrane distillation device exhibiting relatively high flux across a membrane in the distillation device. In a particular implementation, the enhanced membrane distillation device includes a vacuum enhanced direct contact membrane distillation device. In the device, vacuum may be applied to the permeate side, and optionally the feed side, of a flow cell containing the membrane in order to cause the stream to flow under vacuum or reduced pressure and enhance the flux of liquid vapor across the membrane.

A system according to a sixth embodiment is similar to any of the first through fifth embodiments where the water purification unit (of the first embodiment) is an osmotic desalination unit using a relatively easily extractable draw solution (also known as osmotic agent or receiving solution) having a relatively high osmotic potential. In a particular implementation, the draw solution includes ammonium bicarbonate. In a further implementation, the draw solution includes potassium nitrate. In a particular example, product water is extracted from the potassium nitrate draw solution using sulfur dioxide in a draw solution. In a further implementation, the draw solution is Magnetoferritin that can be extracted by magnetic fields.

After passing through the osmotic desalination unit, the solute may be removed from the diluted draw solution. The method of removal may vary according to the nature of the draw solution. For example, when the draw solution includes ammonium bicarbonate, the diluted draw solution may be heated to produce ammonia and carbon dioxide. The solute may be removed from the draw solution through various methods, including column distillation, membrane distillation, a vacuum, a gas stream, filtration, sedimentation, precipitation, and centrifugation. For other solutes, including sulfur dioxide and potassium nitrate, separation of the draw solution may be accomplished by taking advantage of the temperature-dependent solubility characteristics of the draw solution, such as the solubility of a gas or a solid in the solvent of the draw solution. For other solutes, including Magnetoferritin, magnetic field can be used separate the solute from the product water. After removal of the solute, the product water may be used or subjected to further treatment, as desired. For other draw solutions, other methods of removing the solute may be used, including chemical, physical, or biological methods.

Once the solute is removed from the diluted draw solutions, a re-concentrating unit may be used to produce a draw solutions for re-use in the osmotic desalination unit. A heat exchanger, other suitable energy recovery device, or heating or cooling device may be located upstream or downstream of the re-concentrating unit to enhance the re-concentration process or the recovery of energy.

The use of an osmotic desalination unit may be advantageous compared to other desalination techniques, such as reverse osmosis, because the osmotic desalination unit may be less susceptible to membrane fouling. Furthermore, the reduced susceptibility to membrane fouling may reduce the need to pre-treat the feed stream for the osmotic desalination unit. Moreover, certain osmotic agent solutions (such as ammonium bicarbonate, sulfur dioxide, or potassium nitrate), at high but producible concentrations, have osmotic pressures much higher than that of seawater—potentially resulting in a high recovery or flux of water.

Because the solute from the draw solutions may cross the forward-osmosis membrane and enter the concentrate from the osmotic desalination unit, downstream treatments may be used to recover the solute for reuse in the draw solutions. For example, the membrane distillation loop of the fifth embodiment may be used to remove the solute, which can then be returned to a re-concentrating unit, if desired.

The above described systems may be used for processes other than the desalination of seawater. Other processes may include desalination of brackish water, concentration of foods or beverages, and concentration or purification of chemical or pharmaceutical products.

There are additional features and advantages of the subject matter described herein. They will become apparent as this specification proceeds.

In this regard, it is to be understood that this is a brief summary of varying aspects of the subject matter described herein. The various features described in this section and below for various embodiments may be used in combination or separately. A particular embodiment need not provide all features noted above, nor solve all problems or address all issues in the background noted above.

BRIEF DESCRIPTION OF THE DRAWINGS

The description herein makes reference to the accompanying drawings wherein like reference numerals refer to like parts throughout the several views, and wherein:

FIGS. 8A and 8B are diagrams illustrating a flow cell having one or more membrane covered cassettes immersed in a tank that may be used in disclosed forward-osmosis or membrane distillation systems.

DETAILED DESCRIPTION

Terms

Figure 1:
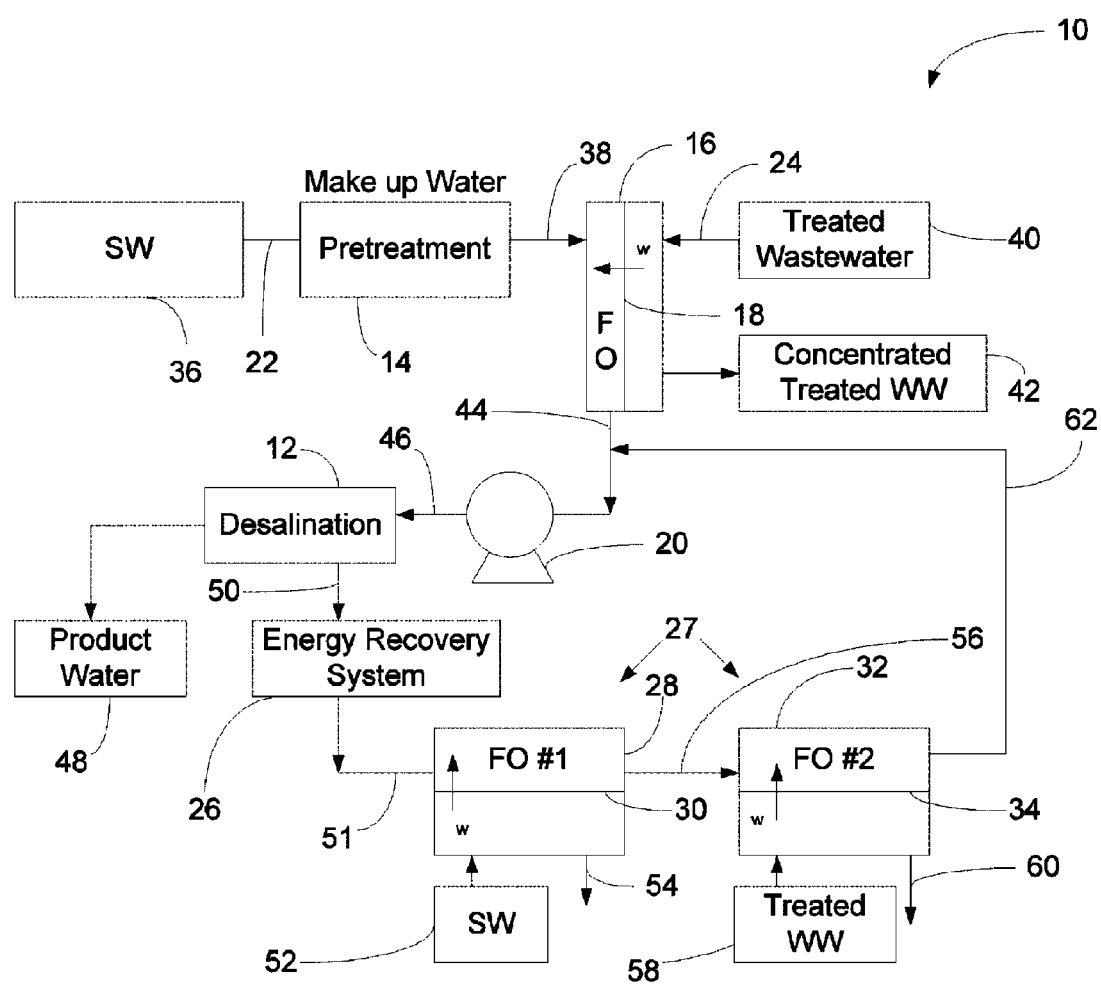
FIG. 1 is a schematic hydraulic diagram of a water-treatment system according to the first exemplary embodiment.

The following terms are used herein:

"Wastewater" is water that has been used in a manner or subject to a condition in which the water has acquired a load of contaminants and/or waste products that render the water incapable of at least certain desired practical uses without being subject to reclamation.

"Water reuse" is a beneficial use of a treated wastewater.

"Wastewater reclamation" is a treatment of a wastewater to a degree to which the water can be reused, yielding "reclaimed" water.

"Direct reuse" is a direct use of a reclaimed wastewater, such as for agricultural and landscape irrigation, use in industry, or use in a dual water system.

"Indirect reuse" is the mixing, dilution, or dispersion of a reclaimed wastewater into a body of "receiving" water or into a groundwater supply prior to reuse.

"Potable water reuse" is the use of a highly treated reclaimed water to provide or augment a supply of drinking water.

"Direct potable reuse" is the introduction of highly treated, high-quality reclaimed water directly into a drinking-water distribution system.

"Indirect potable reuse" is the mixing of reclaimed water with an existing water resource (e.g., a surface resource or a groundwater resource) before the water from the resource is delivered to a drinking-water treatment system. The mixing can occur in a river, lake, or reservoir, or by injection into an aquifer, for example.

"Seawater" (abbreviated "SW") is saline water from the sea or from any source of brackish water.

"Feed water" is water, such as seawater, input to a treatment process such as a desalination process.

"Make-up water" is pretreated and diluted seawater used to augment a desalination loop with salt lost due to diffusion from a concentrate to the seawater or from a concentrate to the treated wastewater during a forward-osmosis process.

"Seawater pretreatment" is a treatment of seawater destined for use as make-up water, wherein the pretreatment includes, but is not limited to, one or more of coagulation, filtration, ion-exchange, disinfection, and any other membrane process, in the stated order or any other order.

"Treated Wastewater" (abbreviated "Treated WW") is reclaimed wastewater that has been subjected to a secondary or tertiary wastewater-treatment process.

"Concentrated Treated Wastewater" (abbreviated "Concentrated Treated WW") is a treated wastewater after water has been extracted from it, such as by an forward-osmosis process; thus, concentrated treated wastewater typically has a higher concentration of solutes and/or other non-water waste products than treated wastewater.

"Impaired Water" is any water that does not meet potable water quality standards.

"Concentrate" is a by product of a water purification processes having a higher concentration of a solute or other material than the feed water, such as a brine by-product produced by a desalination process.

"Draw solution" is a solution having a relatively high osmotic potential that can be used to extract water from a solution having a relatively low osmotic potential. In certain embodiments, the draw solution may be formed by dissolving an osmotic agent in the draw solution.

"Receiving stream" is a stream that receives water by a water purification or extraction process. For example, in forward-osmosis, the draw solution is a receiving stream that receives water from a feed stream of water having a lower osmotic potential than the receiving stream.

"Product Water" is potable water produced by a system as described herein.

In addition, the terms "upstream" and "downstream" are used herein to denote, as applicable, the position of a particular component, in a hydraulic sense, relative to another component. For example, a component located upstream of a second component is located so as to be contacted by a hydraulic stream (flowing in a conduit for example) before the second component is contacted by the hydraulic stream. Conversely, a component located downstream of a second component is located so as to be contacted by a hydraulic stream after the second component is contacted by the hydraulic stream.

Forward Osmosis

A forward-osmosis process is termed "osmosis" or "direct osmosis." Forward-osmosis typically uses a semipermeable membrane having a permeate side and a feed side. The feed (active) side contacts the water (feed water) to be treated. The permeate (support) side contacts a hypertonic solution, referred to as an osmotic agent or a draw solution or receiving stream, that serves to draw (by osmosis) water molecules and certain solutes and other compounds from the feed water through the membrane into the draw solution. The draw solution is circulated on the permeate side of the membrane as the feed water is passed by the feed side of the membrane. Unlike reverse osmosis, which uses a pressure differential across the membrane to induce mass-transfer across the membrane from the feed side to the permeate side, forward-osmosis uses an osmotic-pressure difference as the driving force for mass transfer across the membrane. As long as the osmotic potential of water on the permeate side (draw solution side) of the membrane is higher than the osmotic potential of water on the feed side, water will diffuse from the feed side through the membrane and thereby dilute the draw solution. To maintain its effectiveness in the face of this dilution, the draw solution must typically be re-concentrated, or otherwise replenished, during use. This re-concentration typically consumes most of the energy that conventionally must be provided to conduct a forward-osmosis process.

Because the semipermeable membranes used in forward-osmosis are typically similar to the membranes used in reverse osmosis, most contaminants are rejected by the membrane and only water and some small molecules diffuse through the membrane to the draw solution side. A contaminant that is "rejected" is prevented by the membrane from passing through the membrane. Selecting an appropriate membrane usually involves selecting a membrane that exhibits high rejection of salts as well as various organic and/or inorganic compounds while still allowing a high flux of water through the membrane at a low driving force.

Other advantages of the forward-osmosis process can include relatively low propensity to membrane fouling, low energy consumption, simplicity, and reliability. Because operating pressures in the forward-osmosis process typically are very low (up to a few bars, reflective of the flow resistance exhibited by the housing containing the membranes), the equipment used for performing forward-osmosis can be very simple. Also, use of lower pressure may alleviate potential problems with membrane support in the housing and reduce pressure-mediated fouling of the membrane.

In one application, the disclosed systems and methods can be used to treat raw wastewater to make it potable. The disclosed systems and methods can also be used in the treatment of landfill leachates, foods, and beverages. In particular implementations, more than 97% of the total nitrogen and more than 99.5% of the phosphorus in a feed solution can be rejected by disclosed methods and systems.

Forward-Osmosis-Assisted Desalination

With a suitable forward-osmosis semipermeable membrane, a relatively high flux of fresh water, or water from impaired water, through the membrane into the draw solution (e.g., seawater, concentrated seawater, or other suitable hypertonic solution) can be realized. For example, a draw solution having a solute concentration close to that of seawater can produce flux of at least 10 L/(m$^2$·hr) of clean water through the suitable forward-osmosis membrane into the draw solution. Thus, using forward-osmosis, seawater can be diluted with highly treated wastewater prior to the seawater being subject to desalination, thereby reducing the salinity of the seawater and correspondingly reducing the energy required to desalinate it. The concentrated brine produced may be used as a draw solution in downstream purification processes.

First Exemplary Embodiment

A first exemplary embodiment of a water-treatment process includes a desalination process and one or more forward-osmosis pretreatment stages to reduce feed-water salinity and to reduce or eliminate conventional pretreatment of the feed water. In the process a desalination step is performed in which the feed water is diluted with fresh water. The fresh-water diluent is supplied by forward-osmosis of treated wastewater, run-off water, or any impaired water, for example. Although generally described in these exemplary systems for use in desalinating salt water, the methods and systems described in the exemplary embodiments may be applied to other source liquids.

An exemplary apparatus 10 for performing the process is shown in FIG. 1 and includes the following components: a desalination unit 12, a seawater-pretreatment unit 14, an upstream forward-osmosis unit 16 comprising a forward-osmosis membrane 18, a pump 20, a seawater-feed stream 22, a wastewater (reclaimed or impaired) feed stream 24, an energy-recovery system 26, and a dual-stage forward-osmosis system 27 arranged in a loop.

The seawater-pretreatment unit 14 and upstream forward-osmosis unit 16 collectively provide a water stream that may be used to provide make-up water or start-up water to the desalination unit 12. The desalination unit 12 can be, for example, a reverse osmosis, nanofiltration, electrodialysis, forward-osmosis, ammonium bicarbonate forward-osmosis ("ABFO" or "FO desalination"), distillation, or any other suitable device.

The energy-recovery system 26 can include a heat-exchanger, such as condensers, shell and tube heat exchangers, plate heat exchangers, circulators, radiators, and boilers, which may be parallel flow, cross flow, or counter flow heat exchangers (if the desalination unit 12 is a thermal-desalination device), a power exchanger (if the desalination unit 12 is a pressure-driven desalination device), or other suitable device that extracts usable energy from liquid entering it. The energy-recovery system 26 can be a combination of these exemplary devices as required or desired.

In the embodiment shown in FIG. 1, the dual-stage forward-osmosis system 27 includes a first-stage forward-osmosis unit 28 including a first forward-osmosis membrane 30, and a second-stage forward-osmosis unit 32 including a second forward-osmosis membrane 34. The first-stage forward-osmosis unit 28 and the second-stage forward-osmosis unit 32 are arranged hydraulically in tandem in a hydraulic loop.

Seawater (or other make-up water, termed generally "seawater" here) 36 is drawn from an appropriate source and passes through the pretreatment unit 14. The pretreatment unit 14 pretreats the seawater, as required, such as subjecting it to one or more processes such as coagulation, media filtration, microfiltration, ultrafiltration, beach wells, ion-exchange, chemical addition, disinfection, and other membrane process, in any suitable order. The effluent make-up water 38 from the pretreatment unit 14 enters the upstream forward-osmosis unit 16.

As the make-up water 38 passes through the upstream forward-osmosis unit 16 on the permeate side of the membrane 18, treated wastewater 40, or impaired water, is circulated through the upstream forward-osmosis unit 16 on the feed side of the membrane 18. As a result, the make-up water 38 is diluted by transfer of water (as indicated by the "W" arrows in FIG. 1) from the feed side through the membrane 18. Thus, the treated wastewater 24 is concentrated to produce a concentrate stream 42, and the make-up water 38 is diluted. The diluted water stream 44 exiting the upstream forward-osmosis unit 16 is suitably pressurized by the pump 20 as required by the desalination unit 12. The resulting pressurized water 46 enters the desalination unit 12, which removes particulates, if any, and solutes, such as salt solutes, from the water 46 sufficiently to produce the desired product water 48 (such as potable water). The product water 48 may be subjected to further purification steps. The removed particulates, if any, and solutes, entrained in a concentrate stream 50, pass through the energy-recovery system 26 configured appropriately for the particular type of desalination unit 12, as discussed above.

The de-energized water stream 51 (now at relatively low pressure) passes through the dual-stage forward-osmosis system 27, namely first through the first-stage forward-osmosis unit 28 and then through the second-stage forward-osmosis unit 32. As the de-energized concentrate 51 passes through the first-stage forward-osmosis unit 28 on the permeate side of the membrane 30, seawater 52 (or other suitable impaired water) is circulated through the first-stage forward-osmosis unit 28 on the feed side of the membrane 30. As a result, the concentrate stream 51 is diluted by transfer of water (as indicated by the "W" arrows in FIG. 1) from the feed side of the membrane 30. The concentrated brine 54 from the forward-osmosis unit 28 may be discharged from the first-stage forward-osmosis unit 28.

As the diluted concentrate 56 from the first-stage forward-osmosis unit 28 passes through the second-stage forward-osmosis unit 32 on the permeate side of the membrane 34, treated wastewater 58 (or other impaired water having a suitably low salinity) is circulated through the second-stage forward-osmosis unit 32 on the feed side of the membrane 34. As a result, the diluted concentrate 56 is further diluted by transfer of water (as indicated by the "W" arrows in FIG. 1) from the feed of the membrane 34, thereby concentrating the wastewater 58, or impaired water, in a concentrate stream 60 that is discharged from the second-stage forward-osmosis unit 32. The brine 62 from the second-stage forward-osmosis unit 32, now further diluted, is routed to upstream of the pump 20, thereby completing the loop from downstream of the desalination unit 12 to upstream of it.

After an initial priming of the system 10, in which all the feeds to the desalination unit 12 are passed through the upstream forward-osmosis unit 16, the system 10 runs in a manner by which at least most of the feed water to the desalination unit 12 is supplied by the diluted brine 62 from the second-stage forward-osmosis unit 32. Any required make-up water can be provided by the upstream forward-osmosis unit 16. Supplying at least most of the feed water to the desalination unit 12 from the two-stage forward-osmosis system 27 minimizes dependence of the system 10 on the pretreatment unit 14, thus promoting savings in capital equipment, maintenance, and operating costs.

As an alternative to the hydraulic circuit shown in FIG. 1, the pretreatment unit 14 can be located downstream of the upstream forward-osmosis unit 16, in which event the pretreatment unit 14 still will be located upstream of the pump 20 and upstream of the connection of stream 62 with stream 44. In other words, the make-up water 36 can be pretreated either before or after (but more desirably before) the osmosis step performed by the upstream forward-osmosis unit 16.

The seawater 36 is used as make-up water for replenishing salt lost during desalination by the desalination unit 12, at least during system start-up. The seawater 36 desirably is diluted by the upstream forward-osmosis unit 16 for feeding the desalination unit 12, at least during system start-up. After desalination, as noted above, the energy-recovery system 26 recovers energy from the pressurized concentrate or heated concentrate 50 exiting the desalination unit 12. After recovery of energy from the concentrate 50, the resulting de-energized concentrate 51 passes through the two-stage forward-osmosis system 27, as discussed above, in which the concentrate is diluted by water supplied from seawater, impaired water, wastewater, run-off water, or any other impaired water by forward-osmosis.

Passing the concentrate 50 through the two-stage forward-osmosis unit 27 dilutes the concentrate 50 for use as feed 46 to the desalination unit 12. Since the salinity and load of solutes and other contaminants in the feed 46 may be reduced (compared to ordinary seawater) by the two-stage forward-osmosis system 27, the desalination unit 12 can be operated at a reduced pressure and/or temperature than it otherwise would have to be for producing the desired flux or volume of product water 48. The reduced pressure and/or temperature can yield reduced rates of membrane clogging and fouling in the desalination unit 12.

Because forward-osmosis membranes and processes generally exhibit a low degree of fouling, forward-osmosis can be advantageously used in this embodiment for pretreating reclaimed water or impaired water for use in most desalination processes. This can eliminate other, more expensive, pretreatment steps as well as protect the desalination process.

The concentrate 50 expelled from the desalination unit 12 is mostly recycled in this embodiment, and only a small amount of salt is typically added (in the dual-stage forward-osmosis system 27 and from the upstream forward-osmosis unit 16 as required) to compensate for losses through the forward-osmosis membranes and the desalination unit 12. This is an advantage because, as a result, the desalination unit 12 is not exposed to substantial amounts of new foulants. Moreover, a solution exhibiting a very low scaling tendency can be specifically selected as an osmotic agent in the forward-osmosis units 28, 32, which may reduce the need for use of scale inhibitors.

In the two-stage forward-osmosis system 27, the forward-osmosis performed with seawater dilutes the concentrate stream to below the normal level of seawater salinity. This produces feed water having a lower osmotic pressure for the desalination unit 12. Similarly, in the upstream forward-osmosis unit 16, the forward-osmosis performed with treated seawater dilutes the seawater to below the normal level of seawater salinity, providing feed water having a lower osmotic pressure than seawater for the desalination unit 12. As a result, the energy required by the desalination unit 12 for performing desalination can be lowered or the overall water-recovery or flux of the system 10 enhanced.

Although in this embodiment the forward-osmosis system 27 is depicted and described as a "two-stage" forward-osmosis system, it will be understood that this forward-osmosis system alternatively can include only one forward-osmosis unit or can include more than two forward-osmosis units. In addition, even though the forward-osmosis system 27 is shown and described with the forward-osmosis units being connected in tandem (in series), it will be understood that other interconnection schemes (including parallel connection schemes and/or combinations of parallel and series) can be used.

Another potential advantage of this embodiment is that advanced pretreatment (by the pretreatment unit 14) is performed on only the minimal volume of seawater 36 that is required for making up for salt losses in the system 10. Yet potential advantage of this embodiment is that water streams that would be otherwise typically be treated as waste, such as concentrated brine from the desalination unit 12, can be used to create more product water or lower the capital, maintenance, or energy costs of the system.

It may be desirable to post-treat the product water 48. The particular nature of the post-treatment may depend on the use of the product water 48. In one implementation, the product water 48 can be subjected to one or more of pH adjustment (such as by suitable titration), chlorination, ozonation, UV irradiation, ion exchange, activated-charcoal adsorption, or the like.

It will be understood that this embodiment can be used for purposes other than desalination of seawater or of impaired water. The disclosed embodiment can be used for treating raw wastewater to drinking-water level. The disclosed embodiment may also be used in the treatment of landfill leachates. The disclosed embodiment can also be used in the food industry or in feed solutions as used in the chemical industry, pharmaceutical industry, or biotechnological industry. In particular implementations, more than 97% of the total nitrogen and more than 99.5% of the phosphorus in the feed solution are rejected by the disclosed systems.

Second Exemplary Embodiment

Figure 2:
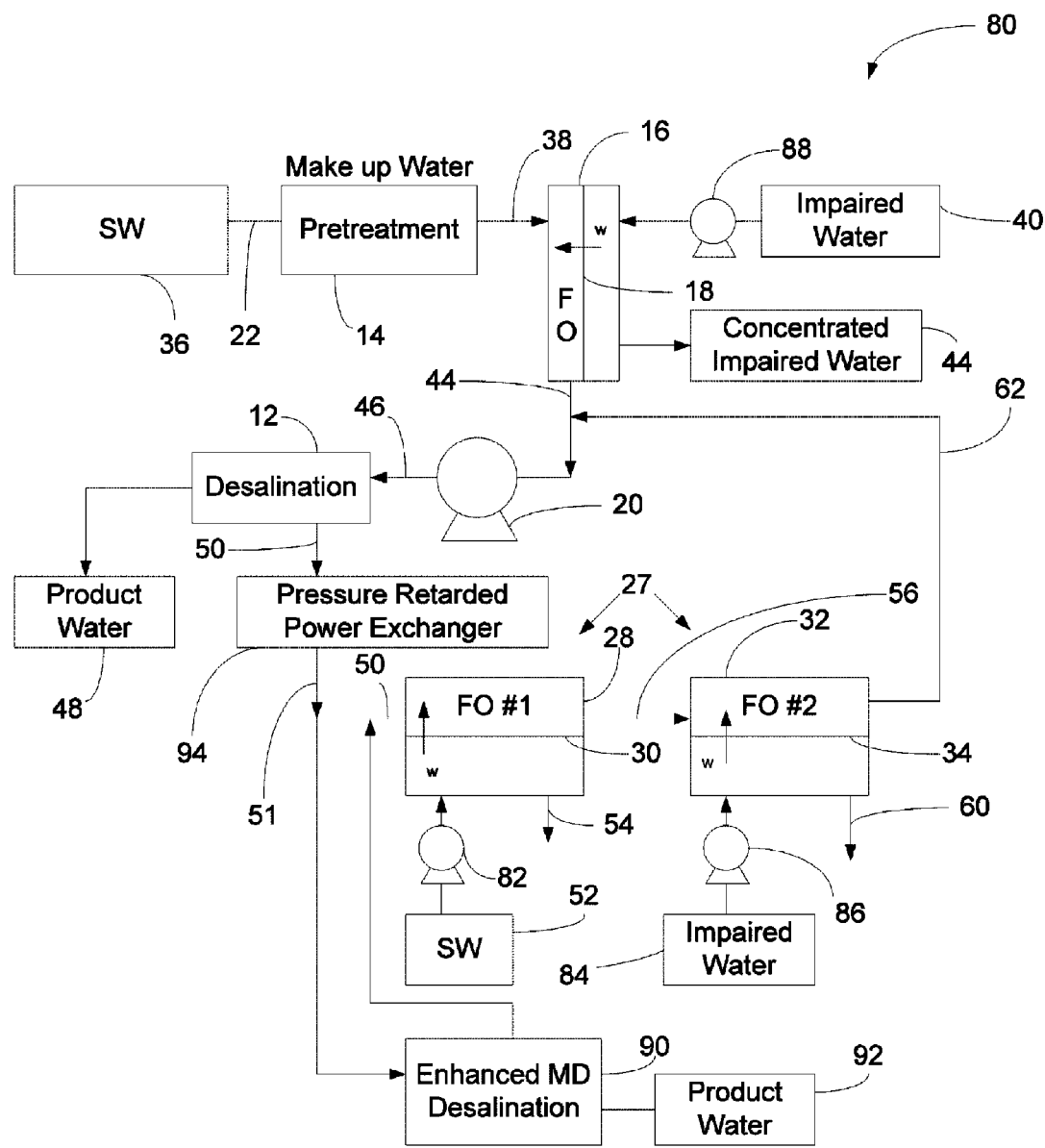
FIG. 2 is a schematic hydraulic diagram of a water-treatment system according to the second exemplary embodiment.

A system 80, which is similar to the system of FIG. 1 in many respects, is depicted in FIG. 2. Components of the system 80 shown in FIG. 2 that are the same as respective components of the system 10 shown in FIG. 1 have the same respective reference designators and are not described further except as noted below.

The system 80 of FIG. 2 includes a dual-stage forward-osmosis device 27 comprising a first-stage forward-osmosis unit 28 and a second-stage forward-osmosis unit 32, as in the first exemplary embodiment. FIG. 2 shows the first-stage forward-osmosis unit 28 being supplied with seawater 52 (as a feed water) by a respective pump 82, and the second-stage forward-osmosis unit 32 being supplied with impaired water 84 (as a feed water) by a respective pump 86. Similarly, the forward-osmosis unit 16 upstream of the desalination unit 12 is supplied with impaired water 40 (as feed water) by a respective pump 88.

In the dual-stage forward-osmosis device 27, the concentrated draw solution 50 produced by the desalination unit 12 contacts the receiving side of the forward-osmosis membrane 30 and seawater (or other suitable water) contacts the feed side of the forward-osmosis membrane 30 in the first-stage forward-osmosis unit 28. Water passing through the membrane 30 from the feed side to the receiving side dilutes the draw solution. The diluted draw solution 56 exiting the first-stage forward-osmosis unit 28 then enters the second-stage forward-osmosis unit 32, in which the diluted draw solution 56 contacts the permeate side of the forward-osmosis membrane 34 and impaired water 84, or another suitable water source, contacts the feed side of the forward-osmosis membrane 34. Both forward-osmosis stages 28, 32 are used to induce seawater (or other feed water) dilution of a draw solution to be used again as feed water 62 to the desalination unit 12.

The embodiment 80 shown in FIG. 2 also includes a membrane distillation desalination device 90 that is used to extract additional product water from the concentrated draw solution 50 produced by the desalination unit 12. The membrane distillation desalination device 90 produces a product-water stream 92 and returns spent concentrated draw solution to concentrate 50 to serve as the draw solution in the first-stage forward-osmosis unit 28. The membrane distillation desalination device 90 is typically relatively insensitive to the salt concentration of the feed solution. Thus, the membrane distillation desalination device 90 can further increase overall recovery or flux of product water 48, 92 from the system 80 and enhance the efficiency of the dual-stage forward-osmosis device 27.

In at least one embodiment, the membrane distillation desalination device 90 is an enhanced membrane distillation desalination device that is able to produce relatively high flux across a membrane (not shown). In a particular implementation, the enhanced membrane distillation desalination device is a direct-contact membrane-distillation device. In a more particular implementation, the enhanced membrane distillation desalination device 90 uses an enhanced membrane distillation method whereby vacuum is applied to a permeate side, and optionally a feed side, of a flow cell (not shown) containing the membrane to cause the stream to flow under vacuum or reduced pressure.

The system 80 can be configured to be more energy efficient. For example, if the desalination unit 12 is pressure-driven (such as nanofiltration or reverse osmosis), the energy-recovery system 26 in the system 80 may include a "pressure-retarded power exchanger" 94. Alternatively, if the desalination unit 12 is thermally driven, the energy-recovery system 26 desirably includes a heat-exchanger (HX) for recovering heat from the concentrate. Suitable heat exchangers include condensers, shell and tube heat exchangers, plate heat exchangers, circulators, radiators, and boilers and may be parallel flow, cross flow, or counter flow heat exchangers.

Figure 3:
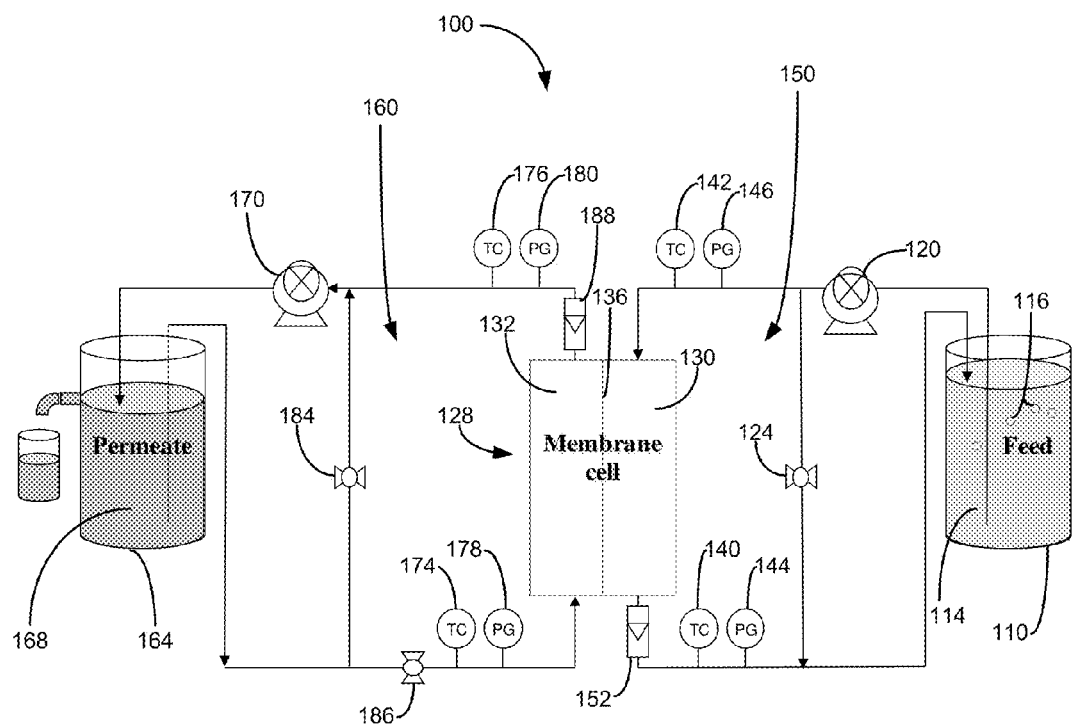
FIG. 3 is a schematic diagram illustrating a vacuum enhanced direct contact membrane distillation system according to an embodiment of the present disclosure.

FIG. 3 illustrates a suitable membrane distillation device that may be used in the Second Exemplary Embodiment. A vacuum enhanced direct contact membrane distillation system 100 is shown having a feed source 110 containing a feed solution 114, such as an impaired liquid. In a particular example, one or more solutes 116 are dissolved in the feed solution 114. When the system 100 is used for desalination, the impaired liquid may be seawater or brackish water. Although the feed source 110 is shown as an isolated tank, any suitable feed source 110 can be used, such as a feed stream from another system or from an intake in communication with a feed source, such as a body of water, for example, an ocean.

The feed solution 114 optionally may be pumped through a pump 120, which may be configured to control the flow rate or to apply positive or negative pressure, as desired. The pump 120 may also be used to cause the feed stream to flow on a membrane 136. One suitable pump 120 for laboratory scale application is the model 1605A pump, available from Procon Pumps of Murfreesboro, Tenn. The flow rate may be further controlled using a valve 124.

The feed solution 114 is transported from the feed source 110 to a flow cell 128. The flow cell 128 has a feed side 130 and a permeate side 132. The membrane 136 is disposed between the feed side 130 and the permeate side 132. The flow cell 128 may be constructed from any suitable material, including polymers. In particular example, the flow cell 128 is formed from acrylic.

The membrane 136 can be a hydrophobic membrane. In particular examples, microporous hydrophobic membranes 136 are used. The microporous hydrophobic membrane 136 may have pores of any suitable size, such as pore sizes of about 0.03 to about 0.5 microns, such as pore sizes of about 0.2 to about 0.45 microns.

The membrane 136 may be made from one or more suitable hydrophobic materials, such as hydrophobic polymers. In particular implementations, highly hydrophobic membranes are used. In further implementations, the membranes are relatively thinner and more porous. Exemplary membranes 136 may be constructed from Teflon or polypropylene (PP).

The membrane 136 may have one layer or multiple layers. For example, the membrane 136 may have one or more active layers and one or more support layers. In a particular embodiment, the membrane 136 has a thin polytetrafluoroethylene (PTFE) active layer and a polypropylene (PP) support sublayer. For membranes 136 having an active layer and a support layer, the active layer typically is positioned facing the feed side 130 of the flow cell 128. Suitable hydrophobic microporous membranes may be obtained from Osmonics Corp. of Minnetonka, Minn. Suitable membranes and their properties are summarized in Table 1 below.

| Membrane | Material | Nominal pore size (μm) | Porosity (%) | Thickness (μm) | Active layer thickness (μm) |
|---|---|---|---|---|---|
| PS22 | PP | 0.22 | 70 | 150 | 150 |
| TS22 | PTFE | 0.22 | 70 | 175 | 5-10 |
| TS45 | PTFE | 0.45 | 70 | 175 | 5-10 |
| TS1.0 | PTFE | 1.0 | 70 | 175 | 5-10 |

Although the membrane 136 is shown as flat, other shapes and configurations may be used for the membrane 136. For example, a flat membrane 136 may be encased, or otherwise supported, in order to help make the membrane 136 more robust.

In at least one embodiment, the flow cell 128 is constructed such that the membrane 136 is held in place in the flow cell 128 by friction or pressure, such as being sandwiched between the feed side 130 and the permeate side 132 of the flow cell 128. However, other means of securing the membrane 136 could be used, such as various fastening or adhesive means, such as tape, glue, clamps, clasps, clips, pins, or screws. Fluid pressure may be used to help keep the membrane 136 from collapsing when vacuum is applied to the feed side 130 or the permeate side 132 of the flow cell 128. The flow cell 128 is typically constructed such that the membrane 136 does not collapse during operation.

Because temperature and pressure can affect the flux of permeate passing from the feed side 130 to the permeate side 132 of the flow cell 128, thermocouples 140, 142 and pressure gauges 144, 146 may be included on the output and input sides, respectively, of the feed cycle 150. A flow meter 152 is located on the output end of the feed side 130 of the flow cell 128.

Turning now to the permeate cycle 160, permeate passing through the membrane 136 condenses into a permeate stream 168 and is conducted to a permeate reservoir 164. The permeate reservoir 164 is shown as a discrete tank, but the permeate reservoir 164 could be other types of reservoirs. The permeate reservoir 164 could also be a transport device for carrying the permeate solution 168 to another system or location. The permeate solution 168 is typically a solution containing less solute (is more dilute) than the feed solution 114. When the permeate 168 is water, in particular implementations, the permeate stream is distilled water, de-ionized water, potable water, runoff water, or other water having a relatively low amount of total dissolved solids.

In particular examples, a relatively low amount of total dissolved solids is less than about 1,000 mg/l of total dissolved solids, such as less than about 500 mg/l. In a more particular example, the amount of total dissolved solids in the permeate stream is an amount that, when mixed with water crossing the membrane 136, produces a product water having a concentration of total dissolved solids of less than about 500 mg/l. In a particular example, the concentration of total dissolved solids in the permeate 168 is between about 200 mg/l and about 500 mg/l.

The permeate loop 160 includes a vacuum pump 170 for placing the permeate side 132 of the flow cell 128 under vacuum, which may be lower than ambient pressure or lower than the pressure of the feed loop 150. The pump 170 may also cause the permeate solution 168 to flow over the membrane 136. The vacuum pump 170 may be of any suitable type to produce the range of pressures desired, typically between 0.1 and 1.0 atmospheres, such as between about 0.5 about 1.0 atmospheres. One suitable pump 170 for small laboratory application is the model 1605A pump, available from Procon Pumps of Murfreesboro, Tenn.

As with the feed loop 150, the permeate loop 160 may be provided with thermocouples 174, 176 and pressure gauges 178, 180 at the input and exits ends, respectively, of the flow cell 128 in order to monitor or control the pressure or temperature of the permeate loop 160. A bypass valve 184 is provided to assist in controlling the pressure of the permeate loop 160. A front valve 186 is located proximate the input end of the permeate side 132 of the flow cell 128 to provide further control of the flow rate of the permeate solution 168 and the pressure of the permeate cycle 160. A flow meter 188 is provided at the output of the permeate side 132 of the flow cell 128.

According to a particular method of the present invention, the system 100 is operated while applying a vacuum to the permeate cycle 160. In a particular implementation, the vacuum may be any pressure less than atmosphere pressure. In a further implementation, the vacuum may be any pressure less than the pressure of the feed loop 150. The temperature of the feed solution 114 is typically maintained higher than the temperature of the permeate solution 168, such as at least about 5 degrees higher, such as at least 10 degrees higher.

For water based feed solutions 114 and permeate solutions 168, greater temperature differentials between the feed solution 114 and the permeate solution 168 generally result in higher flux across the membrane 136. Increased feed solution 114 temperature generally increases the flux across the membrane 136 due the increased vapor pressure of the feed solution. Increased vacuum (lower pressure) on the permeate cycle 160 also typically increases the flux across the membrane 136.

In operation, relatively warmer feed solution 114 enters the feed side 130 of the flow cell 128. Vapor from the feed solution 114 enters the pores of the membrane 136 and flows to the permeate side 132 of the flow cell 128. The permeate vapor condenses into the permeate solution 168 and is carried out of the flow cell 128 for recovery. The system 100 is typically run as a continuous process.

Figure 4:
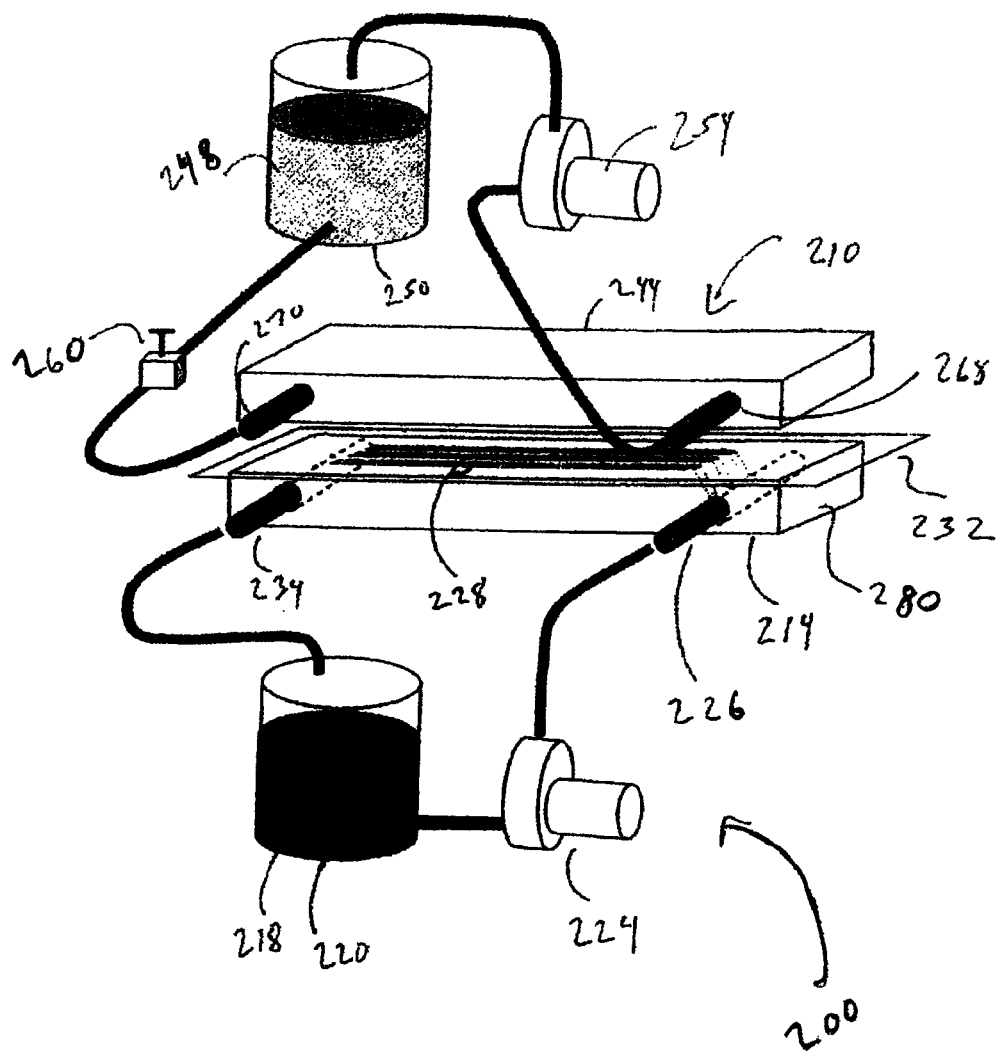
FIG. 4 is a schematic diagram illustrating a flow cell that may be used in the system of FIG. 3.

FIG. 4 is a detailed view of a system 200 including a flow cell 210 that may be used in the vacuum enhanced direct contact membrane distillation system 100 of FIG. 3. The flow cell 210 has a feed compartment 214 that receives a feed solution 218 from a feed tank 220. A pump 224 is used to control the flow of the feed solution 218.

The feed solution 218 enters the feed compartment 214 through an inlet port 226. Narrow channels (not shown in FIG. 2) are used to transport the feed solution 218 to flow channels 228 formed in the feed compartment 214. In at least one embodiment, the flow channels 228 have a width of between about 1 and about 5 millimeters. In particular implementations, the flow cell 210 is designed to have the feed solution 218 flowing with a high Reynolds number. In more particular implementations, the flow cell 210 is designed such that high turbulence (reflected by the high Reynolds number) may be achieved at relatively low pressure (for example, 30-40 psi). In addition, the feed solution 218 may be used to provide support for a membrane 232 so that the membrane 232 does not collapse during operation of the system 200. After passing through the flow channels 228, the feed solution 218 passes out of the flow cell 210 through an outlet port 234.

The flow cell 210 has a permeate (product) compartment 244 which abuts the feed compartment 214. The membrane 232 is positioned between the permeate compartment 244 and the feed compartment 214. In certain embodiments, the membrane 232 is a flat sheet membrane. In particular embodiments, the membrane 232 is supported by fluid on the both sides of the flow cell 210. However, other support means or affixing means could be used, if desired, to secure the membrane 232 in position, such as adhesive or fastener means, including tape, glue, screws, clips, clasps, clamps, or pins.

A permeate solution 248 is stored in a permeate tank 250. A pump 254 and a valve 260 can be used to control the flow velocity of the permeate solution 248 and the pressure of the permeate cycle. The permeate compartment 244 is constructed similarly to the feed compartment 214, including the arrangement and construction of flow channels (not shown).

The permeate solution 248 enters the permeate compartment though an inlet 268 and exits the permeate compartment though an outlet 270.

Third Exemplary Embodiment

Figure 5:
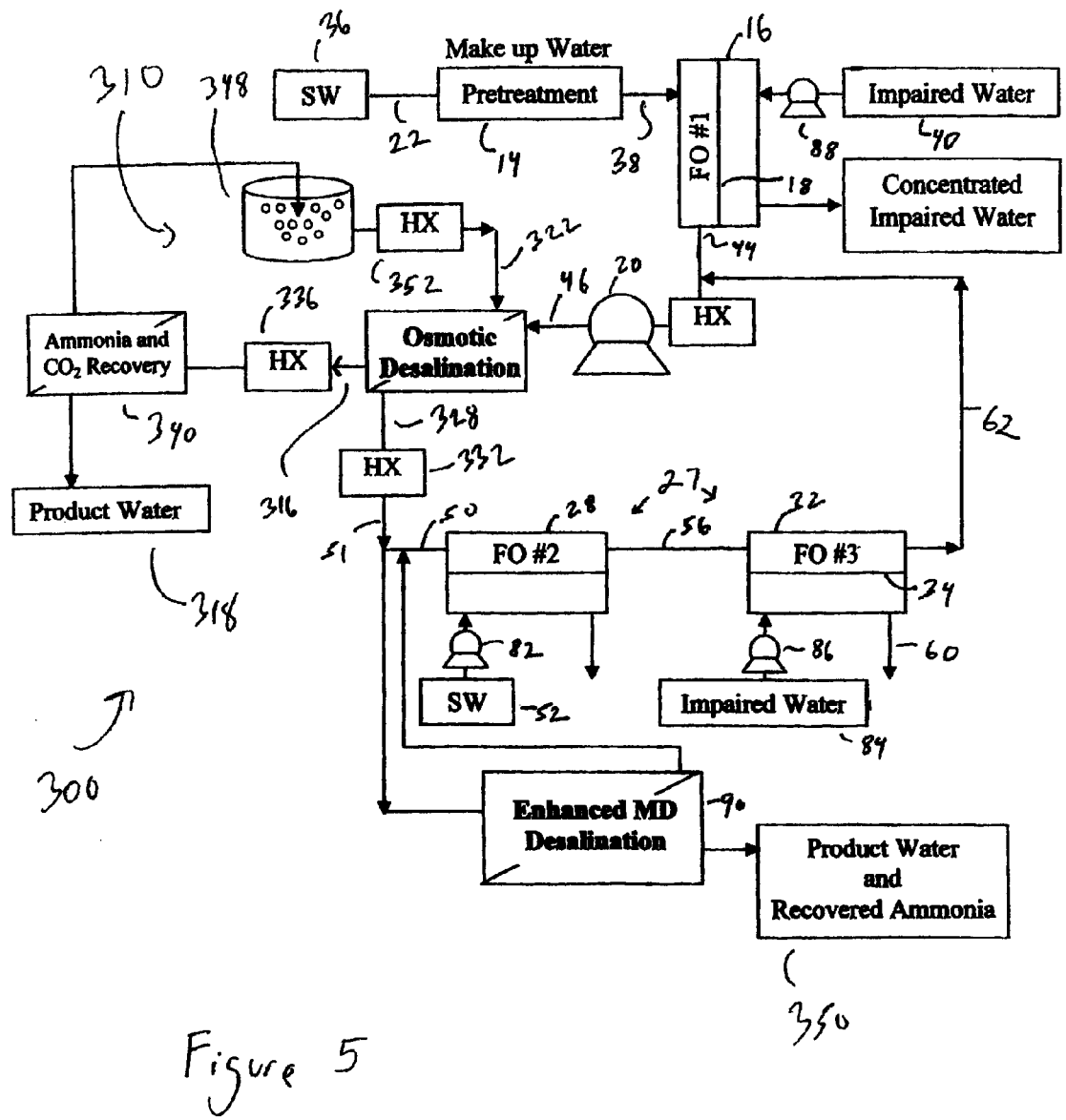
FIG. 5 is a schematic hydraulic diagram of a water-treatment system according to the third exemplary embodiment.

A system 300 is illustrated in FIG. 5. Components of the system 300 shown in FIG. 5 that are the same as respective components of the system 10 shown in FIG. 1, or the system 80 shown in FIG. 2 have the same respective reference designators and are not described further except as noted below. The system of FIG. 5 will be described in conjunction with components of the system of FIG. 2, but could be used in other systems, including the system of FIG. 1.

The system 300 of FIG. 5 includes a dual-stage forward-osmosis device 27 having a first-stage forward-osmosis unit 28 and a second-stage forward-osmosis unit 32, as in the first and second embodiments. As in the second embodiment, the first stage forward-osmosis unit 28 includes a membrane distillation device 90 to extract additional product water from the concentrate 50 produced by the desalination unit 12. The membrane distillation device 90 also produces more concentrated brine for use as the draw solution in the first-stage downstream forward-osmosis unit 28, thus increasing the efficiency of the first-stage forward-osmosis unit 28.

In the embodiment of FIG. 5, the desalination unit 12 is an osmotic desalination unit where a concentrated, easily extractable, draw solution is used to draw water from the feed 46. The osmotic desalination unit 12 is part of an osmotic desalination system 310. Any suitable draw solution, osmotic desalination unit 12, and osmotic desalination system 310 can be used.

The draw solution used in the osmotic desalination system 310, in particular implementations, is a relatively easily extractable osmotic agent that requires relatively low energy, or a relatively simple mechanism, for separation and is relatively easily recovered from the diluted osmotic agent solution 316. For example, the osmotic agent may be precipitated from the solution or converted to a gas and driven out of the diluted draw solution 316 or it can be Magnetoferritin particles extracted by magnetic field. In certain implementations, the draw solution has a solubility that is substantially temperature dependent, such as potassium nitrate, sulfur dioxide, or ammonium bicarbonate. In further embodiments, the osmotic agent may separated with different forces such as a magnetic field or an electromagnetic field. In further implementations, the draw solution is in equilibrium with one or more other species. Removal or concentration of the draw solution can be accomplished by driving the equilibrium to favor the desired species. Accordingly, the draw solution can be removed from the diluted osmotic agent solution 316 to produce product water 318. The draw solution may be recycled for use in the osmotic desalination unit 12.

As shown in FIG. 5, feed water 46 enters the osmotic desalination unit 12 and contacts one side of a membrane (not shown). The other side of the membrane contacts an osmotic agent solution 322. In a particular embodiment, the draw solution 322 is formed by dissolving ammonia and carbon dioxide gas. When these gasses are dissolved, a solution will form containing ammonium carbonate (($NH_4$)$_2CO_3$), ammonium bicarbonate ($NH_4HCO_3$), and ammonium carbamate ($NH_2COONH_4$). Alternatively, these species could be directly added to the draw solution 322, such as in solid form or in solution.

Le Chetalier's Principle may be used to drive the equilibrium to favor a particular species, such as by buffering the solution with an excess of ammonia gas. Doing so will drive the equilibrium to favor the more soluble ammonium carbamate species over the less soluble ammonium bicarbonate. In one example, the ratio of ammonia to carbon dioxide is about 1.75 to 2.0. In particular implementations, the total concentration of solute in the draw solution 322 is greater than about 2 molal, such as greater than about 6 molal, such as between about 6 molal and about 12 molal. If desired, the concentration of the draw solution 322 can be further increased, such as by raising its temperature, in order to allow more solute to be solubilized. For example, the temperature can be raised to about 50 to about 55° C., thus allowing up to about an 18 molal solution to be formed. When ammonium carbamate is used as a draw solution, the temperature of the solution is typically kept below about 58° C., above which it may decompose.

Because of the higher osmotic potential of the draw solution 322, water will diffuse through the membrane from the feed water 46 and into the draw solution 322, thus diluting it. A desired rate of flux can be achieved by proper selection of the concentration of the draw solution 322. The flux rate can also be controlled by the nature and size of the membrane used. For example, a smaller membrane can still give appreciable flux if the draw solution 322 is sufficiently concentrated. Any suitable semi-permeable membrane may be used, such as those made from organic materials such as cellulose nitrate, polysulfone, cellulose acetate, polyvinylidene fluoride, polyamide, and acrylonitrile co-polymers. Mineral or ceramic membranes may also be used, such as those made from zirconate or titinate. The membrane is typically chosen to withstand the chemical and physical environment in which it will be used, such as the pH, temperature, and pressure used. In particular examples, the membrane is a model AG or CE reverse osmosis membrane available from GE Osmonics of Trevose, Pa. Other suitable membranes, including forward osmosis membranes, are available from Hydration technologies of Albany, Oreg.

After exiting the osmotic desalination unit 12, the concentrate (concentrated brine) 328 enters a heat exchanger 332 which can recover energy from the concentrated brine 328. Suitable heat exchangers include condensers, shell and tube heat exchangers, plate heat exchangers, circulators, radiators, and boilers and may be parallel flow, cross flow, or counter flow heat exchangers. The concentrated brine 328 then proceeds to the dual-stage forward-osmosis system 27, as was discussed in the Second Exemplary Embodiment.

After leaving the osmotic desalination unit 12, carbon dioxide may optionally be added to the diluted osmotic agent solution 316 in order to increase the concentration of the relatively insoluble ammonium bicarbonate. Precipitated ammonium bicarbonate can optionally be recovered from the diluted draw solution 316 and recycled. Means for recovering solid materials are well known in the art and include sedimentation tanks, screen filtration, column filtration, hydrocyclones, or nucleation point, such as a precipitation mass. The temperature of the diluted draw solution 316 may be optionally cooled, such as to about 18 to 25° C., such as to about 20 to 25° C. Cooling the diluted draw solution 316 may increase the amount of osmotic agent precipitated from the diluted draw solution 316.

The diluted draw solution 316, typically with a portion of the solute removed, enters a heat exchanger 336 where the diluted draw solution 316 is heated. Upon heating, the ammonium bicarbonate in the diluted draw solution 316 will decompose into carbon dioxide and ammonia. In certain implementations, the diluted draw solution 316 is heated to about 30 to about 100° C., such as from about 30 to about 60° C., such as to about 60°. The diluted draw solution 316 passes from the heat exchanger 336 to an ammonia- and carbon-dioxide-recovery device 340. The recovery device 340 may be any suitable device for extracting the carbon dioxide and ammonia from the diluted draw solution 316. In particular examples, the recovery device 340 is a column distillation unit or a membrane distillation unit. A vacuum or stream of air may be included in the recovery device 340 to aid in removing the gasses driven out of the diluted draw solution 316. The recovered ammonia and carbon dioxide gas can then be used in the processes described above for altering the equilibrium of the draw solution.

From the recovery device 340, product water 318 is produced and the carbon dioxide and ammonia are used to re-concentrate the draw solution 322 in a concentration unit 348. The re-concentrated draw solution 322 then enters a heat exchanger 352 to enhance the re-concentration process and to recover energy from the solution.

Because of the high concentration of ammonium bicarbonate used in the draw solution 322, some ammonia may diffuse through the membrane of the osmotic desalination unit 12. When used in conjunction with the process described herein, most of the ammonia lost to the concentrate 51 stays in the system 300 and can be later harvested in one or more processes of the system 300. For example, in at least one embodiment, the ammonia in the concentrate 51 may be separated from the concentrate 51 during the membrane distillation process 90. The recovered ammonia 350 can be returned to the recovery device 340, if desired. In contrast to certain previous desalination techniques where brine (concentrate from the desalination) is directly discharged back to the sea/ocean, in the proposed configuration most of the ammonia nitrogen is not released to the environment.

As previously mentioned, the present disclosure is not limited ammonium bicarbonate draw solution 322. Any extractable solute having a high osmotic potential can be used as the draw solution and any suitable extraction technique can be used. For example, U.S. Pat. No. 6,391,205, which is expressly incorporated by reference in its entirety, discuses desalination of water using a first draw solution, such as $KNO_3$, $Na_3PO_4$, or sucrose, having a solubility that increases with increasing temperature. After extracting water from the feed stream, the diluted draw solution is transferred to a heat exchanger to cool the solution, and the draw solution is removed. The diluted draw solution is then subjected to another forward osmosis step using a draw solution having a solubility that decreases with decreasing temperature, such as sulfur dioxide gas. After this extraction step, the sulfur dioxide can be removed by heating the product water. Residual sulfur dioxide can be removed from the product water, such as with an acid removal system, such as a lime bed.

The above described exemplary embodiments may be implemented in any suitable manner, which may depend on the particular application, including the scale of the application. The various components, such as heat exchangers and purification units, may be made of suitably non-reactive materials such as plastic, PVC, stainless steel, fiberglass, and PVC. Liquid sources or other vessels may be cylindrical tanks, water towers, contoured tanks, or fitted tanks.

Flow Cell Configurations

The present disclosure provides a number of flow cell configurations that may be used in the forward-osmosis or membrane distillation units of the disclosed systems. The components of the flow cells are generally similar whether they are used for membrane distillation or forward osmosis. The membrane used in the flow cell is selected for the particular flow cell application. For example, membranes used in membrane distillation flow cells are typically hydrophobic. Hydrophilic membranes are typically used in forward-osmosis flow cells. In particular implementations, the membranes used in the disclosed flow cells are hollow fiber or tubular membranes.

Figure 6:
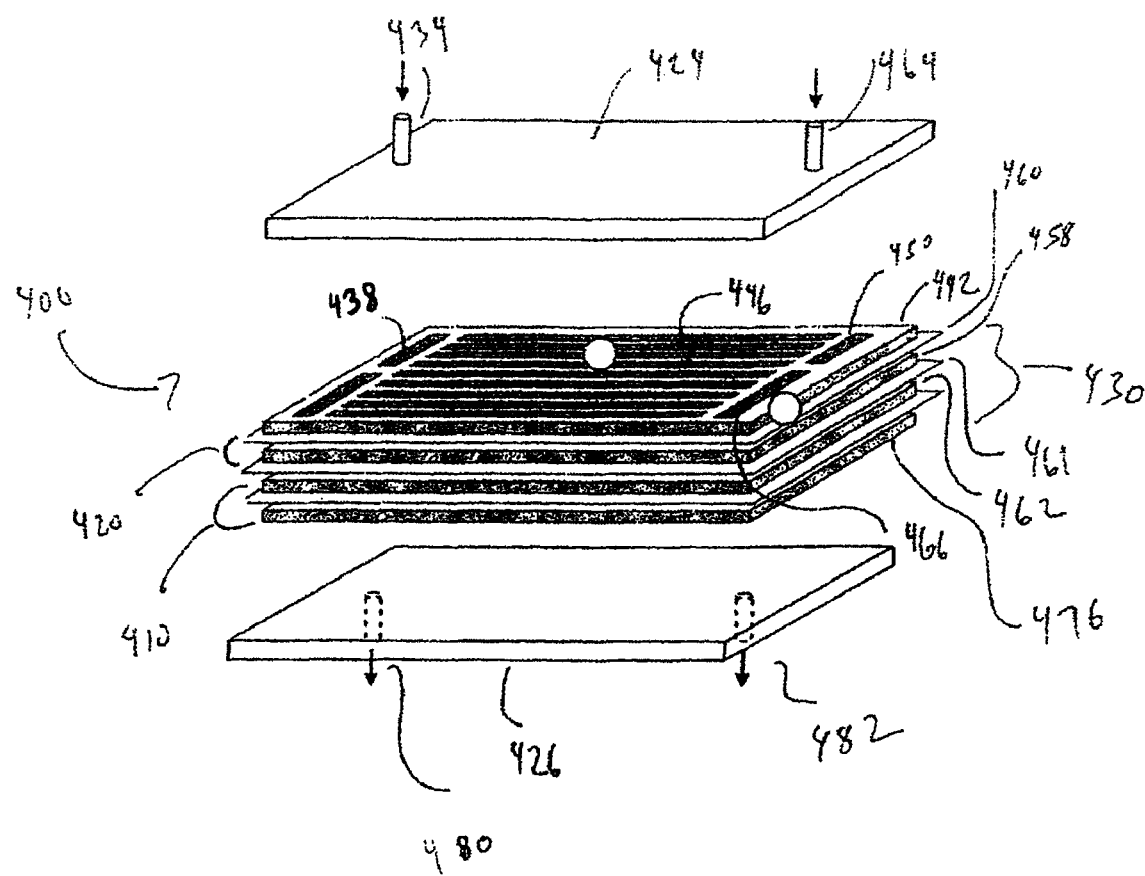
FIG. 6 is a diagram illustrating a flow cell having a stack of frames and membranes between two plates that may be used in disclosed forward-osmosis or membrane distillation systems.

With reference to FIG. 6, a number of gaskets 410 and membranes 420 may be included between two plates 424, 426 in order to form a stack 430. In operation, feed solution enters the flow cell 400 through an inlet port 434 formed in the plate 424. The feed solution will flow through a flow duct 438 of a gasket 442 and then into flow channels 446 of the gasket 442.

The flow channels 446 are typically constructed such that high turbulence (such as indicated by a relatively large Reynolds number, such as a Reynolds number of at least about 2300, for example, a Reynolds number of at least about 5000) can be achieved. Particularly when used for membrane distillation, in at least certain implementations, the flow channels 446 are constructed such that high turbulence is achieved at relatively low pressure (for example, 30-40 psi). The flow channels 446 also are preferably constructed to provide support for the membranes 420. In at least one embodiment, the flow channels 446 have of width of between about 1 mm and about 5 mm. Of course, the construction of the flow cell 400, including the dimensions and orientation of the flow channels 446, the turbulence achieved, and the operational pressure can be varied according to the needs of a particular application.

After flowing through the flow channels 446 of the gasket 442, the feed solution enters a flow duct 450 in the gasket 442, passes through an opening (not shown) in a membrane 460, and enters a flow duct (not shown, at least substantially congruent with the flow duct 450) in a gasket 458. The solution will then be conducted, without passing through the flow channels (not shown, at least similar to flow channels 446) in the gasket 458, through an opening in a membrane 461 and into a flow duct in a gasket 462. The feed solution will flow through the flow channels (not shown) in the gasket 462.

A draw solution enters the flow cell 400 through an inlet 464 in the plate 424 and into a flow duct 466. From the flow duct 466, the permeate solution is directed through a corresponding opening (not shown) in the membrane 460 and into a flow duct (not shown, at least substantially congruent with the flow duct 466) of the gasket 462. The permeate solution will be conducted into flow channels (not shown, at least similar to flow channels 446).

The feed and draw solutions continue to flow in this way through all of the membranes 420 and the gaskets 410 in the stack 430. The draw solution and feed solutions thus flow through alternate gaskets 410. The membranes 420 are oriented such that if the membrane 410 has an active surface, the active surface is facing the feed stream.

After passing through the last gasket 476, the draw solution and feed streams exit the flow cell 400 through outlet ports 480, 482. In this way, the flow cell 400 provides multiple water extraction processes in each pass of the feed and draw solutions through the flow cell 400.

Figure 7:
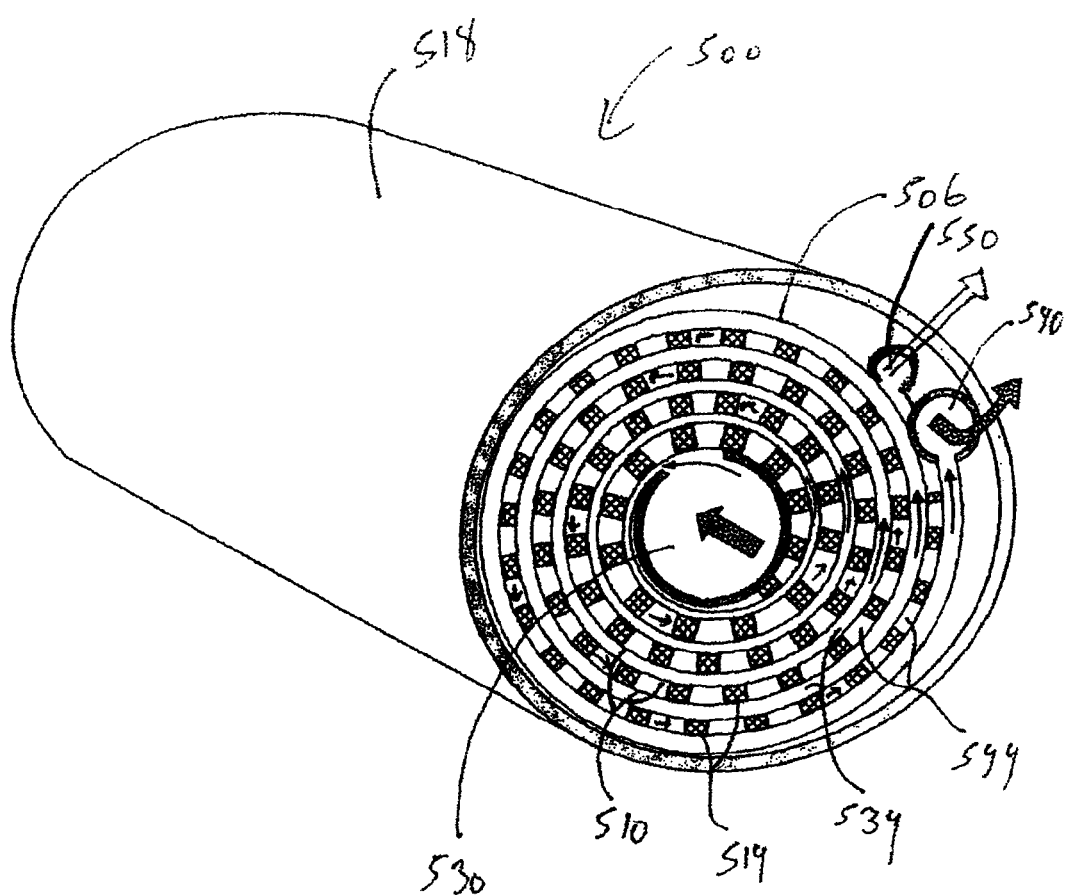
FIG. 7 is a diagram illustrating a flow cell having a membrane envelope inside of a pressure vessel that may be used in disclosed forward-osmosis or membrane distillation systems.

An alternate flow cell 500 is illustrated in FIG. 7. An envelope 506 of membranes layers 510 and supports 514 is inserted in a pressure vessel 518. The envelope 506 is formed by rolling a flat membrane, thus forming the membrane layers 510. The supports 514 are included between each membrane layer 510. The supports 514 provide support for the membrane layers 510, allowing fluid to flow on both sides of each membrane layer 510.

The supports 514 may be of any suitable size, number, shape, and dimension, made of any suitable material, and placed in any suitable location. In one embodiment, the supports 514 are made of mesh, preferably plastic mesh. In another embodiment, the supports 514 are plastic rods. The supports 514 are preferably porous solids in order to provide structural support to the membrane layers 510 while allowing fluid to flow between the supports 514. When draw solution flows between the supports 514 and feed solution flows on the other side of each membrane layer 510, water extraction can occur across each membrane layer 510.

The feed stream can be introduced into the envelope 506 by a central inlet tube 530. From the central inlet tube 530, the feed solution is introduced into the feed channels 534 between the membrane layers 510 through holes (not shown) formed in the walls of the central inlet tube 530, such as drilled holes. After passing through the channels 534, the feed solution exits the envelope 506 though an outlet 540.

In a similar manner, the draw solution can be introduced into permeate channels 544 containing the supports 514 though an inlet (not shown). After passing though the permeate channels 544, the draw solution exits the envelope 506 through an outlet 550.

Another alternate flow cell 560 is illustrated in FIGS. 8A and 8B. One or more cassettes 562 are covered on both faces 564 with a flat sheet membrane 566 appropriate for membrane distillation or forward-osmosis, depending on the particular application. A porous support spacer 568 is placed inside the cassette 562 between the two membranes 566. The spacer 568 provides support for the membrane layers 566, allowing fluid to flow on both sides of each membrane layer 566 and allowing the cassette 562 to be used under vacuum.

Each cassette 562 has one or more inlet ports 570 allowing draw solution to flow into the cassette 562. Each cassette 562 also has one or more outlet ports 572 to allow diluted draw solution to flow out of the cassette 562. The flow inside the cassette 562 is under negative pressure (vacuum) when used for membrane distillation. The cassette (or cassettes) 562 is immersed in a tank 580 containing feed water. Although the cassettes 562 and membranes 566 are shown as rectangular, other sizes and shapes of cassettes and membranes could be used, such as square, round, or semi-circular cassettes and membranes. In addition, each cassette may have more than two faces 564. In particular implementations, the membranes 566 are secured to each cassette 562, such as by an adhesive or a fastener, such as by tape, glue, clips, clasps, clamps, pins, or screws. Either feed or draw solution can flow inside the cassette.

The supports 568 may be of any suitable size, number, shape, and dimension and made of any suitable material. In one embodiment, the supports 568 are made of mesh, such as a plastic mesh. In another embodiment, the supports 568 are plastic rods. The supports 568 are preferably porous solids in order to provide structural support to the membrane layers 566 while allowing fluid to flow between the supports 568. When permeate solution flows between the supports 568 and feed solution flows on the other side of each membrane layer 566, water extraction can occur across each membrane layer 566.

The feed stream can be introduced into the tank 580 by any suitable inlet, such as perforated inlet tubes 582 in the tank 580, such as in the bottom of the tank 580. In a particular implementation, the inlet is configured to evenly distribute feed water in spaces between each cassette 562. In further implementations the inlet is located elsewhere in the tank 580 or is an inlet other than perforated inlet tubes 582.

From the perforated inlet tube 582, the feed solution is introduced into the feed tank 580 between the membrane cassettes 562. After passing between the cassettes 562, the feed solution exits the tank 580 though an outlet 590.

The draw solution is introduced into the inside of the cassette 562 through one or more inlet ports 570. After passing though the permeate porous support spacer 568, the diluted draw solution exits the cassette 562 through the outlets 572. If desired, the permeate stream or feed stream can be passed through the flow cell 560 multiple times. In other embodiments, the permeate stream or feed stream is removed from the system after one pass through the flow cell 560.

Examples of the First Exemplary Embodiment

A mathematical model was developed to predict the cost saving in a 35,000 gallon-per-day desalination plant using forward-osmosis-assisted desalination by reverse osmosis, as described in the foregoing exemplary embodiments. Reverse osmosis-modeling software (ROSA®, Dow Chemical Company of Midland, Mich.) was used for modeling the reverse osmosis unit, and a self-developed modeling spreadsheet was used for modeling the forward-osmosis stages. The reverse osmosis unit was modeled using eight 8-inch Filmtec membranes (SW30-380, 35 m$^2$ membrane area per membrane element, available from Dow Chemical Company of Midland, Mich.) under operational parameters of 800 psi feed pressure and 45 gpm feed flowrate. The dual-stage forward-osmosis units were modeled as having a total of 16 membrane elements each having an area of 35 m$^2$. Three cases were modeled, including: (1) direct seawater desalination, (2) diluted seawater desalination under similar operating conditions as with direct seawater desalination, and (3) diluted seawater desalination at lower feed pressure than used for direct seawater desalination.

When comparing cases (1) and (2), the product-water recovery (ratio between product-water flowrate and feed flowrate to the desalination unit) and water-production rate were both more than 30% higher than obtained using conventional systems. When comparing cases (1) and (3), the model predicted that, under the same recovery and production rates (approximately 49% recovery) the reverse osmosis desalination unit could be operated at a feed pressure of 595 psi instead of 800 psi, with a corresponding increase in usable lifetime of the desalination unit.

Example 1

This example sets forth the ROSA results obtained under case (1) noted above.

System Summary:

| | |
|---|---|
| Feed flow to stage 1 | 45.00 gpm |
| Permeate flow | 22.00 gpm |
| Raw water flow to system | 45.00 gpm |
| Recovery | 48.90% |
| Feed pressure | 800.00 psig |
| Feed temperature | 20.00 C. |
| Fouling factor | 1.00 |
| Feed TDS | 34567.17 mg/L |
| Chem. Dose | none |
| Number of elements | 8 |
| Total active area | 3040.00 ft$^2$ |
| Average system flux | 10.42 gfd |
| Water classification | seawater (open intake) SDI < 5 |

| Stage | Element | #PV | #Ele | Feed Flow (gpm) | Feed Press (psig) | Recirc Flow (gpm) | Conc Flow (gpm) | Conc Press (psig) | Perm Flow (gpm) | Avg Flux (gfd) | Perm Press (psig) | Boost Press (psig) | Perm TDS (mg/L) |
|---|---|---|---|---|---|---|---|---|---|---|---|---|---|
| 1 | SW30-380 | 1 | 8 | 45.00 | 795.00 | 0.00 | 23.00 | 765.56 | 22.00 | 10.42 | 0.00 | 800.00 | 451.98 |

| (mg/L, except pH) | Raw Water | Adj Feed | Permeate | Concentrate |
|---|---|---|---|---|
| NH$_4$ | 0.00 | 0.00 | 0.00 | 0.00 |
| K | 0.00 | 0.00 | 0.00 | 0.00 |
| Na | 10872.50 | 10872.51 | 168.60 | 21114.12 |
| Mg | 1298.66 | 1298.66 | 4.70 | 2536.74 |
| Ca | 413.76 | 413.76 | 1.47 | 808.24 |
| Sr | 0.10 | 0.10 | 0.00 | 0.20 |
| Ba | 0.02 | 0.02 | 0.00 | 0.04 |
| CO$_3$ | 0.00 | 0.00 | 0.00 | 0.00 |
| HCO$_3$ | 0.00 | 0.00 | 0.00 | 0.00 |
| NO$_3$ | 0.00 | 0.00 | 0.00 | 0.00 |
| Cl | 19271.49 | 19272.25 | 273.03 | 37450.90 |
| F | 12.91 | 12.91 | 0.22 | 25.06 |
| SO$_4$ | 2694.04 | 2694.04 | 3.88 | 5268.01 |
| Boron | 0.00 | 0.00 | 0.00 | 0.00 |
| SiO$_2$ | 2.92 | 2.92 | 0.07 | 5.64 |
| CO$_2$ | 0.00 | 0.00 | 0.00 | 0.00 |
| TDS | 34592.31 | 34567.17 | 451.98 | 67208.95 |
| pH | 7.60 | 7.60 | 7.60 | 7.60 |

Solubility Warnings:
BaSO$_4$ (% Saturation)>100%
CaF$_2$ (% Saturation)>100%
Scaling Calculations:

| | Raw Water | Adj Feed | Concentrate |
|---|---|---|---|
| pH | 7.60 | 7.60 | 7.60 |
| Langelier Saturation Index | −5.79 | −5.79 | −5.23 |
| Stiff & Davis Stability Index | −6.75 | −6.75 | −6.42 |
| Ionic Strength (Molal) | 0.72 | 0.72 | 1.44 |
| TDS (mg/L) | 34592.31 | 34592.31 | 67208.95 |
| HCO$_3$ | 0.00 | 0.00 | 0.00 |
| CO$_2$ | 0.00 | 0.00 | 0.00 |
| CO$_3$ | 0.00 | 0.00 | 0.00 |
| CaSO$_4$ (% Saturation) | 15.48 | 15.48 | 38.93 |
| BaSO$_4$ (% Saturation) | 70.68 | 70.68 | 161.15 |
| SrSO$_4$ (% Saturation) | 0.19 | 0.19 | 0.50 |
| CaF$_2$ (% Saturation) | 9172.68 | 9172.68 | 67471.10 |
| SiO$_2$ (% Saturation) | 2.54 | 2.54 | 4.91 |

To balance: 0.01 mg/L Na added to feed.

Array Details:

| Stage 1 | Element | Recov. | Perm Flow (gpm) | Perm TDS (mg/L) | Feed Flow (gpm) | Feed TDS (mg/L) | Feed Press (psig) |
|---|---|---|---|---|---|---|---|
| | 1 | 0.12 | 5.28 | 181.73 | 45.00 | 34567.17 | 795.00 |
| | 2 | 0.11 | 4.41 | 239.87 | 39.72 | 39140.54 | 789.30 |
| | 3 | 0.10 | 3.58 | 322.25 | 35.30 | 44002.44 | 784.49 |
| | 4 | 0.09 | 2.81 | 439.87 | 31.73 | 48926.88 | 780.38 |
| | 5 | 0.07 | 2.16 | 607.05 | 28.91 | 53644.99 | 776.80 |
| | 6 | 0.06 | 1.62 | 842.11 | 26.76 | 57922.11 | 773.62 |
| | 7 | 0.05 | 1.24 | 1142.63 | 25.13 | 61611.17 | 770.73 |
| | 8 | 0.04 | 0.90 | 1608.85 | 23.89 | 64745.41 | 768.07 |

Example 2

This example sets forth the ROSA results obtained under case (2) noted above.

System Summary:

| | |
|---|---|
| Feed flow to stage 1 | 45.00 gpm |
| Permeate flow | 28.81 gpm |
| Raw water flow to system | 45.00 gpm |
| Recovery | 64.01% |
| Feed pressure | 800.00 psig |
| Feed temperature | 20.00 C. |
| Fouling factor | 1.00 |
| Feed TDS | 24535.12 mg/L |
| Chem. Dose | none |
| Number of elements | 8 |
| Total active area | 3040.00 ft$^2$ |
| Average system flux | 13.64 gfd |
| Water classification | seawater (open intake) SDI < 5 |

| Stage | Element | #PV | #Ele | Feed Flow (gpm) | Feed Press (psig) | Recirc Flow (gpm) | Conc Flow (gpm) | Conc Press (psig) | Perm Flow (gpm) | Avg Flux (gfd) | Perm Press (psig) | Boost Press (psig) | Perm TDS (mg/L) |
|---|---|---|---|---|---|---|---|---|---|---|---|---|---|
| 1 | SW30-380 | 1 | 8 | 45.00 | 795.00 | 0.00 | 16.19 | 771.59 | 28.81 | 13.64 | 0.00 | 800.00 | 320.77 |

| (mg/L, except pH) | Raw Water | Adj Feed | Permeate | Concentrate |
|---|---|---|---|---|
| NH$_4$ | 0.00 | 0.00 | 0.00 | 0.00 |
| K | 274.50 | 274.50 | 4.78 | 754.27 |
| Na | 7546.29 | 7546.29 | 116.19 | 20762.55 |
| Mg | 901.36 | 901.36 | 3.27 | 2498.84 |
| Ca | 287.48 | 287.48 | 1.02 | 797.01 |
| Sr | 5.69 | 5.69 | 0.02 | 15.77 |
| Ba | 0.02 | 0.02 | 0.00 | 0.06 |
| CO$_3$ | 0.00 | 0.00 | 0.00 | 0.00 |
| HCO$_3$ | 0.00 | 0.00 | 0.00 | 0.00 |
| NO$_3$ | 0.00 | 0.00 | 0.00 | 0.00 |
| Cl | 13604.71 | 13605.17 | 192.47 | 37462.95 |
| F | 9.12 | 9.12 | 0.18 | 25.00 |
| SO$_4$ | 1903.46 | 1903.46 | 2.78 | 5284.27 |
| Boron | 0.00 | 0.00 | 0.00 | 0.00 |
| SiO$_2$ | 2.03 | 2.03 | 0.05 | 5.54 |

-continued

| (mg/L, except pH) | Raw Water | Adj Feed | Permeate | Concentrate |
|---|---|---|---|---|
| $CO_2$ | 0.00 | 0.00 | 0.00 | 0.00 |
| TDS | 24552.33 | 24535.12 | 320.77 | 67606.28 |
| pH | 7.60 | 7.60 | 7.60 | 7.60 |

Solubility Warnings:
$BaSO_4$ (% Saturation)>100%
$CaF_2$ (% Saturation)>100%
Scaling Calculations:

| | Raw Water | Adj Feed | Concentrate |
|---|---|---|---|
| pH | 7.60 | 7.60 | 7.60 |
| Langelier Saturation Index | −5.94 | −5.94 | −5.10 |
| Stiff & Davis Stability Index | −6.79 | −6.79 | −6.29 |
| Ionic Strength (Molal) | 0.50 | 0.50 | 1.44 |
| TDS (mg/L) | 24552.33 | 24552.33 | 67606.28 |
| $HCO_3$ | 0.00 | 0.00 | 0.00 |
| $CO_2$ | 0.00 | 0.00 | 0.00 |
| $CO_3$ | 0.00 | 0.00 | 0.00 |
| $CaSO_4$ (% Saturation) | 9.48 | 9.48 | 38.51 |
| $BaSO_4$ (% Saturation) | 64.44 | 64.44 | 216.68 |
| $SrSO_4$ (% Saturation) | 10.01 | 10.01 | 40.20 |
| $CaF_2$ (% Saturation) | 3176.15 | 3176.15 | 66243.19 |
| $SiO_2$ (% Saturation) | 1.76 | 1.76 | 4.82 |

To balance: 0.00 mg/L Cl added to feed.
Array Details:

| Stage 1 Element | Recov. | Perm Flow (gpm) | Perm TDS (mg/L) | Feed Flow (gpm) | Feed TDS (mg/L) | Feed Press (psig) |
|---|---|---|---|---|---|---|
| 1 | 0.16 | 7.01 | 106.92 | 45.00 | 24535.12 | 795.00 |
| 2 | 0.16 | 5.99 | 145.47 | 37.99 | 29044.26 | 789.51 |
| 3 | 0.15 | 4.90 | 204.73 | 31.99 | 34457.96 | 785.17 |
| 4 | 0.14 | 3.81 | 297.61 | 27.09 | 40652.76 | 781.75 |
| 5 | 0.12 | 2.81 | 444.98 | 23.29 | 47253.31 | 779.01 |
| 6 | 0.10 | 1.99 | 678.46 | 20.47 | 53680.52 | 776.75 |
| 7 | 0.07 | 1.36 | 1040.12 | 18.49 | 59371.06 | 774.83 |
| 8 | 0.05 | 0.93 | 1573.55 | 17.13 | 64014.18 | 773.14 |

Example 3

This example sets forth the ROSA results obtained under case (3) noted above.
System Summary:

| Feed flow to stage 1 | 45.00 gpm |
|---|---|
| Permeate flow | 22.05 gpm |
| Raw water flow to system | 45.00 gpm |
| Recovery | 49.01% |
| Feed pressure | 595.00 psig |
| Feed temperature | 20.00 C. |
| Fouling factor | 1.00 |
| Feed TDS | 24535.12 mg/L |
| Chem. Dose | none |
| Number of elements | 8 |
| Total active area | 3040.00 ft$^2$ |
| Average system flux | 10.45 gfd |
| Water classification | seawater (open intake) SDI < 5 |

| Stage | Element | #PV | #Ele | Feed Flow (gpm) | Feed Press (psig) | Recirc Flow (gpm) | Conc Flow (gpm) | Conc Press (psig) | Perm Flow (gpm) | Avg Flux (gfd) | Perm Press (psig) | Boost Press (psig) | Perm TDS (mg/L) |
|---|---|---|---|---|---|---|---|---|---|---|---|---|---|
| 1 | SW30-380 | 1 | 8 | 45.00 | 590.00 | 0.00 | 22.95 | 560.18 | 22.05 | 10.45 | 0.00 | 595.00 | 317.61 |

| (mg/L, except pH) | Raw Water | Adj Feed | Permeate | Concentrate |
|---|---|---|---|---|
| $NH_4$ | 0.00 | 0.00 | 0.00 | 0.00 |
| K | 274.50 | 274.50 | 4.78 | 533.75 |
| Na | 7546.29 | 7546.29 | 115.11 | 14689.09 |
| Mg | 901.36 | 901.36 | 3.18 | 1764.69 |
| Ca | 287.48 | 287.48 | 1.00 | 562.84 |
| Sr | 5.69 | 5.69 | 0.02 | 11.14 |
| Ba | 0.02 | 0.02 | 0.00 | 0.04 |
| $CO_3$ | 0.00 | 0.00 | 0.00 | 0.00 |
| $HCO_3$ | 0.00 | 0.00 | 0.00 | 0.00 |
| $NO_3$ | 0.00 | 0.00 | 0.00 | 0.00 |
| Cl | 13604.71 | 13605.17 | 190.59 | 26499.18 |
| F | 9.12 | 9.12 | 0.18 | 17.71 |
| $SO_4$ | 1903.46 | 1903.46 | 2.69 | 3730.46 |
| Boron | 0.00 | 0.00 | 0.00 | 0.00 |
| $SiO_2$ | 2.03 | 2.03 | 0.05 | 3.93 |
| $CO_2$ | 0.00 | 0.00 | 0.00 | 0.00 |
| TDS | 24552.33 | 24535.12 | 317.61 | 47812.83 |
| pH | 7.60 | 7.60 | 7.60 | 7.60 |

Solubility Warnings:
$BaSO_4$ (% Saturation)>100%
$CaF_2$ (% Saturation)>100%
Scaling Calculations:

| | Raw Water | Adj Feed | Concentrate |
|---|---|---|---|
| pH | 7.60 | 7.60 | 7.60 |
| Langelier Saturation Index | −5.94 | −5.94 | −5.39 |
| Stiff & Davis Stability Index | −6.79 | −6.79 | −6.46 |
| Ionic Strength (Molal) | 0.50 | 0.50 | 1.00 |
| TDS (mg/L) | 24552.33 | 24552.33 | 47812.83 |
| $HCO_3$ | 0.00 | 0.00 | 0.00 |
| $CO_2$ | 0.00 | 0.00 | 0.00 |
| $CO_3$ | 0.00 | 0.00 | 0.00 |
| $CaSO_4$ (% Saturation) | 9.48 | 9.48 | 23.74 |
| $BaSO_4$ (% Saturation) | 64.44 | 64.44 | 138.86 |
| $SrSO_4$ (% Saturation) | 10.01 | 10.01 | 23.43 |
| $CaF_2$ (% Saturation) | 3176.15 | 3176.15 | 23454.36 |
| $SiO_2$ (% Saturation) | 1.76 | 1.76 | 3.41 |

To balance: 0.00 mg/L Cl added to feed.

Array Details:

| Stage 1 | Element | Recov. | Perm Flow (gpm) | Perm TDS (mg/L) | Feed Flow (gpm) | Feed TDS (mg/L) | Feed Press (psig) |
|---|---|---|---|---|---|---|---|
| | 1 | 0.11 | 4.73 | 140.86 | 45.00 | 24535.12 | 590.00 |
| | 2 | 0.10 | 4.11 | 177.96 | 40.27 | 27399.74 | 584.31 |
| | 3 | 0.10 | 3.49 | 228.19 | 36.16 | 30493.95 | 579.42 |
| | 4 | 0.09 | 2.90 | 296.65 | 32.67 | 33730.55 | 575.20 |
| | 5 | 0.08 | 2.35 | 390.36 | 29.77 | 36989.11 | 571.52 |
| | 6 | 0.07 | 1.87 | 518.40 | 27.41 | 40132.56 | 568.26 |
| | 7 | 0.06 | 1.46 | 692.42 | 25.54 | 43035.87 | 565.33 |
| | 8 | 0.05 | 1.13 | 925.20 | 24.08 | 45609.10 | 562.66 |

Forward-Osmosis Modeling:

Seawater-WW Effluent System

| | $P_{OS}^{SW}$ psi | $C_{SW}$ g/l | $Q_{SW}$ l/min | $Q_{WW}$ l/min | $C_{WW}$ g/l | $P_{OS}^{WW}$ psi | |
|---|---|---|---|---|---|---|---|
| 1 | 331.05 | 27.84 | 67.48 | 16.19 | 0.44473 | 4.03467 | 20 |
| 2 | 330.04 | 27.76 | 67.69 | 16.40 | 0.43915 | 3.98404 | 19 |
| 3 | 329.04 | 27.67 | 67.89 | 16.60 | 0.43372 | 3.93482 | 18 |
| 4 | 328.05 | 27.59 | 68.10 | 16.81 | 0.42844 | 3.88693 | 17 |
| 5 | 327.08 | 27.51 | 68.30 | 17.01 | 0.42331 | 3.84033 | 16 |
| 6 | 326.10 | 27.42 | 68.50 | 17.21 | 0.41831 | 3.79496 | 15 |
| 7 | 325.14 | 27.34 | 68.71 | 17.42 | 0.41344 | 3.75077 | 14 |
| 8 | 324.19 | 27.26 | 68.91 | 17.62 | 0.40869 | 3.70773 | 13 |
| 9 | 323.24 | 27.18 | 69.11 | 17.82 | 0.40407 | 3.66578 | 12 |
| 10 | 322.30 | 27.10 | 69.31 | 18.02 | 0.39956 | 3.62488 | 11 |
| 11 | 321.38 | 27.03 | 69.51 | 18.22 | 0.39516 | 3.58500 | 10 |
| 12 | 320.45 | 26.95 | 69.71 | 18.42 | 0.39087 | 3.54609 | 9 |
| 13 | 319.54 | 26.87 | 69.91 | 18.62 | 0.38669 | 3.50812 | 8 |
| 14 | 318.63 | 26.80 | 70.11 | 18.82 | 0.38260 | 3.47106 | 7 |
| 15 | 317.74 | 26.72 | 70.31 | 19.02 | 0.37861 | 3.43487 | 6 |
| 16 | 316.84 | 26.65 | 70.50 | 19.21 | 0.37472 | 3.39952 | 5 |
| 17 | 315.96 | 26.57 | 70.70 | 19.41 | 0.37091 | 3.36499 | 4 |
| 18 | 315.08 | 26.50 | 70.90 | 19.61 | 0.36719 | 3.33124 | 3 |
| 19 | 314.21 | 26.42 | 71.09 | 19.80 | 0.36356 | 3.29826 | 2 |
| 20 | 313.35 | 26.35 | 71.29 | 20.00 | 0.36000 | 3.26600 | 1 |

| | |
|---|---|
| Module Recovery | 19.05% |
| Water Recovered | 3.81 L/min |
| Flux | 6.53 L/m²/hr |

Seawater: ρ[psi]=CF*417.97
Effluent: ρ[psi]=CF*3.266
K membrane=3.5948*10⁻⁴ L/hr/psi

| | |
|---|---|
| K | 0.00035948 l/min/m²/psi |
| ΔA | 1.75 m² |
| Total A | 35 m² |
| CS | m² |
| $CS_{SWin}$ = | 27.84 g/l TDS |
| $C_{WWin}$ = | 0.36 g/l TDS |
| $C_{CONCin}$ = | 55.19 g/l TDS |

-continued

| | |
|---|---|
| $Q_{SWin}$ = | 67.48 l/min |
| $Q_{WWin}$ = | 20 l/min |
| $Q_{CONCin}$ = | 74.41 l/min |

It is to be understood that the above discussion provides a detailed description of various embodiments. The above descriptions will enable those skilled in the art to make many departures from the particular examples described above to provide apparatus constructed in accordance with the present invention. The embodiments are illustrative, and not intended to limit the scope of the present invention. Changes may be made in the construction and operation of the various components, elements and assemblies described herein and changes may be made in the steps or sequence of steps of the methods described herein. The scope of the present invention is rather to be determined by the scope of the claims as issued and equivalents thereto.

What is claimed is:

1. A water purification method comprising:
    passing a stream of feed water and a stream of draw solution through a first forward-osmosis unit to produce a diluted stream of draw solution;
    passing the diluted stream of draw solution through a desalination unit to produce a stream of product water and a stream of concentrated draw solution;
    whereby desalinating the diluted stream of draw solution requires less energy than desalinating the draw solution;
    wherein passing the diluted stream of draw solution through a desalination unit to produce a stream of product water and a stream of concentrated draw solution comprises passing a first osmotic draw solution comprising a first relatively easily extractable osmotic agent through the desalination unit to cause water from the diluted stream of draw solution to dilute the first osmotic draw solution comprising a first relatively easily extractable osmotic agent to form a diluted first osmotic draw solution.

2. The method of claim 1, further comprising passing the stream of concentrated draw solution and a stream of salt water through a second forward osmosis unit to produce a diluted stream of concentrated draw solution.

3. The method of claim 2, further comprising passing the diluted stream of concentrated draw solution through a third forward osmosis unit to produce a feed stream for the desalination unit.

4. The method of claim 1, further comprising extracting the first relatively easily extractable osmotic agent from the diluted first osmotic draw solution to form the stream of product water.

5. The method of claim 1, wherein extracting the first relatively easily extractable osmotic agent from the diluted first osmotic draw solution to form the stream of product water comprises passing the diluted first osmotic draw solution and a second osmotic draw solution comprising a second relatively easily extractable osmotic agent through a second forward osmosis unit, causing the second osmotic draw solution to be diluted.

6. The method of claim 5, further comprising extracting the second relatively easily extractable solute from the second osmotic draw solution.

* * * * *